United States Patent
Yoshida et al.

(10) Patent No.: US 8,516,289 B2
(45) Date of Patent: Aug. 20, 2013

(54) STORAGE MANAGEMENT APPARATUS FOR CONTROLLING POWER SUPPLY TO STORAGES, STORAGE SYSTEM INCLUDING THE SAME, AND METHOD FOR CONTROLLING POWER SUPPLY TO STORAGES

(75) Inventors: Masahiro Yoshida, Kawasaki (JP);
Tadashi Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 13/008,235

(22) Filed: Jan. 18, 2011

(65) Prior Publication Data
US 2011/0185213 A1    Jul. 28, 2011

(30) Foreign Application Priority Data
Jan. 27, 2010    (JP) ................................. 2010-015303

(51) Int. Cl.
*G06F 1/00*    (2006.01)
*G06F 1/30*    (2006.01)

(52) U.S. Cl.
CPC ...................................... *G06F 1/30* (2013.01)
USPC ............................ 713/330; 713/340; 713/323

(58) Field of Classification Search
USPC .................... 713/300–340, 114; 711/114
See application file for complete search history.

(56) References Cited

U.S. PATENT DOCUMENTS

| 6,233,693 | B1 | 5/2001 | Berglund et al. | |
|---|---|---|---|---|
| 7,469,315 | B2* | 12/2008 | Watanabe et al. | 711/114 |
| 8,145,930 | B2* | 3/2012 | Kono et al. | 713/323 |
| 2001/0008018 | A1 | 7/2001 | Kamo et al. | |
| 2007/0079156 | A1* | 4/2007 | Fujimoto | 713/300 |
| 2007/0143542 | A1* | 6/2007 | Watanabe et al. | 711/114 |
| 2007/0170782 | A1* | 7/2007 | Suzuki et al. | 307/28 |
| 2009/0292871 | A1* | 11/2009 | Watanabe et al. | 711/114 |
| 2010/0057991 | A1* | 3/2010 | Yoshida et al. | 711/114 |
| 2012/0072664 | A1* | 3/2012 | Higaki et al. | 711/114 |

FOREIGN PATENT DOCUMENTS

| JP | 4-78062 A | 3/1992 |
|---|---|---|
| JP | 2000-10678 A | 1/2000 |
| JP | 2001-186655 A | 7/2001 |

* cited by examiner

*Primary Examiner* — Raymond Phan
(74) *Attorney, Agent, or Firm* — Fujitsu Patent Center

(57) ABSTRACT

A storage management apparatus includes a memory for storing logical volume information for indicating logical volumes and priority information for determining an order of the logical volumes to be activated, a first interface for connecting storages to the storage management apparatus, at least one of the storages corresponding to one of the logical volumes, a second interface connected to a power supply unit for supplying power to the storages, and a processor for executing determining whether the power supply unit is capable of supplying power for simultaneously starting the storages corresponding to the logical volumes corresponding to an access request for accessing the logical volumes, selecting one logical volume based on the priority information when the power supply unit is incapable of supplying power for simultaneously starting the storages, and transmitting a start request for staring the storages corresponding to the selected logical volume by using the first interface.

18 Claims, 20 Drawing Sheets

| (FEV. 1, 1ST WEEK,) TIME | RLU#0 OPERATIONAL RANK | RLU#1 OPERATIONAL RANK | RLU#2 OPERATIONAL RANK | RLU#3 OPERATIONAL RANK | RLU#4 OPERATIONAL RANK | ... |
|---|---|---|---|---|---|---|
| 00:00:00 - 00:30:00 | A | D | A | B | C | ... |
| 00:30:00 - 01:00:00 | A | D | A | B | C | ... |
| 01:00:00 - 01:30:00 | A | D | A | A | B | ... |
| 01:30:00 - 02:00:00 | A | D | A | A | B | ... |
| ... | ... | ... | ... | ... | ... | ... |

| RLU NO. | STATUS | ECO FLAG | MOTOR STATUS | TIER LEVEL (BASE) | TIER LEVEL | DISK TYPE |
|---|---|---|---|---|---|---|
| RLU#0 | AVAILABLE | OFF | ON | 0 | 0 | SSD |
| RLU#1 | AVAILABLE | ON | OFF | 3 | 4 | SATA |
| RLU#2 | AVAILABLE | ON | ON | 1 | 1 | FC/SAS |
| RLU#3 | AVAILABLE | ON | ON PROGRESS | 2 | 1 | FC/SAS |
| RLU#4 | AVAILABLE | ON | OFF | 2 | 2 | FC/SAS |
| .. | .. | .. | .. | .. | .. | .. |

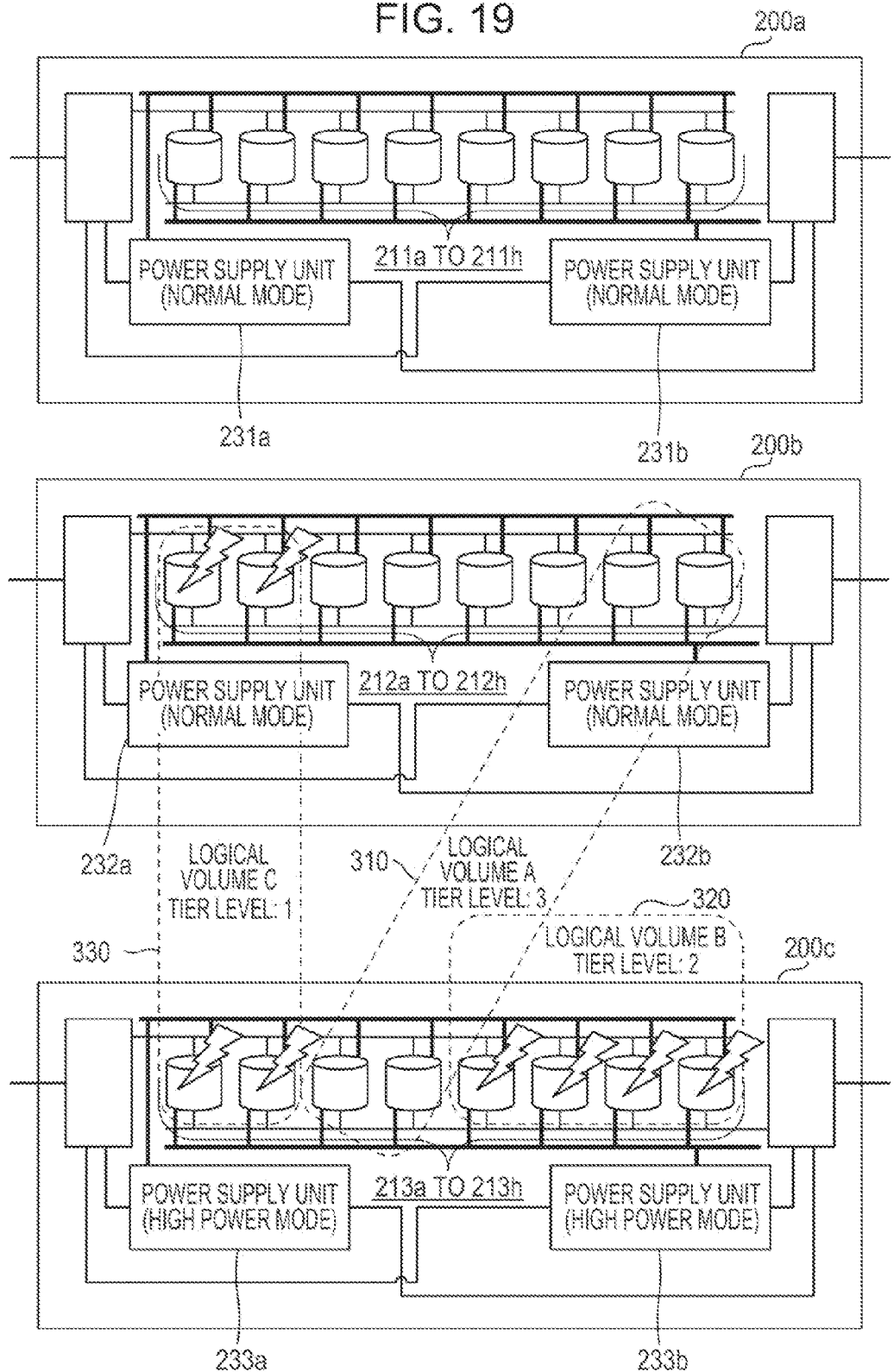

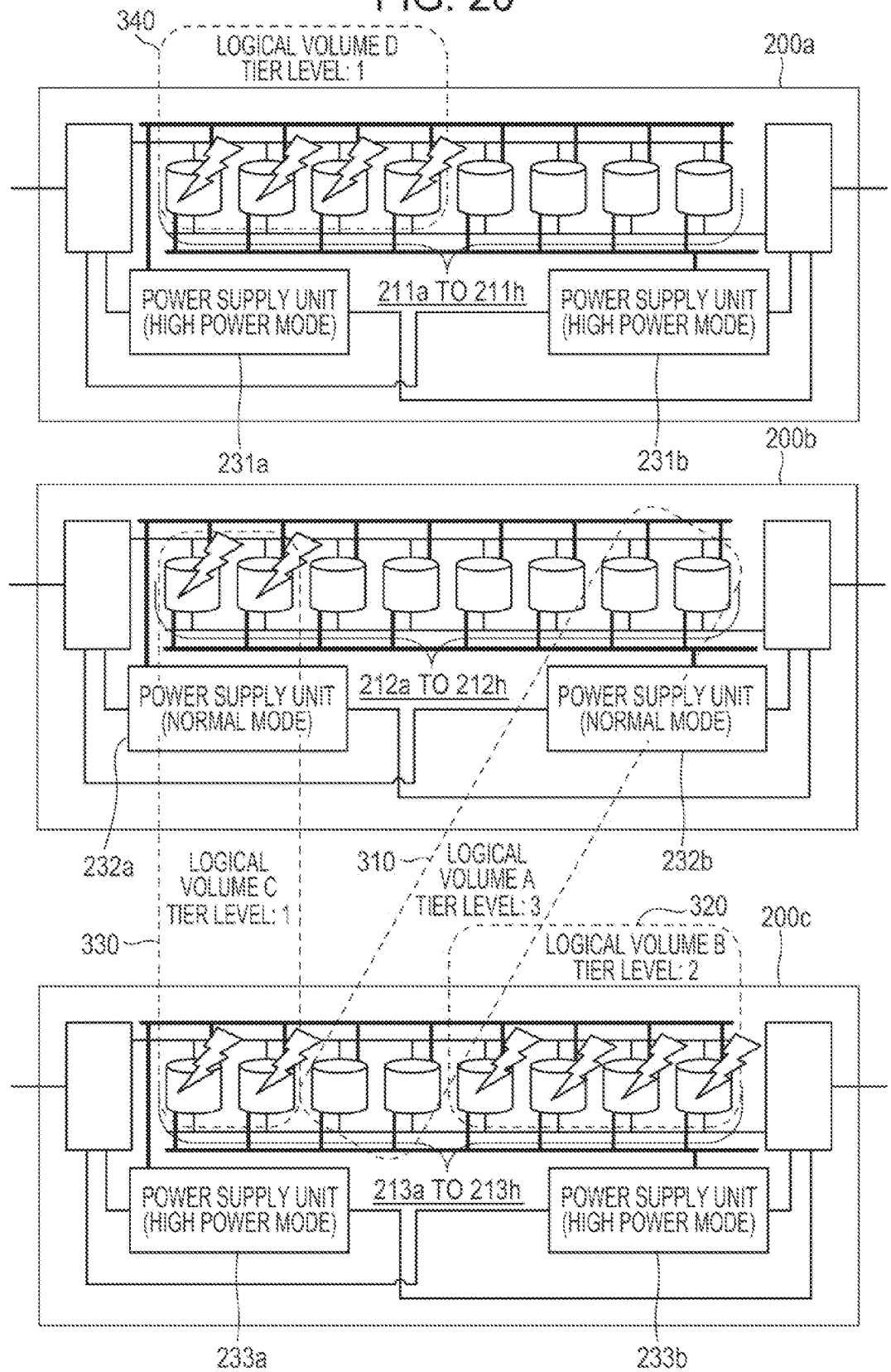

STORAGE MANAGEMENT APPARATUS FOR CONTROLLING POWER SUPPLY TO STORAGES, STORAGE SYSTEM INCLUDING THE SAME, AND METHOD FOR CONTROLLING POWER SUPPLY TO STORAGES

CROSS-REFERENCE TO RELATED APPLICATION

This application is based upon and claims the benefit of priority of the prior Japanese Patent Application No. 2010-015303, filed on Jan. 27, 2010 the entire contents of which are incorporated herein by reference.

FIELD

The embodiment discussed herein is related to a storage system.

BACKGROUND

Regulations and computerized works have increased the demands for information memories for managing and saving all of electronic mails, data, and documents. One of the memories may be a storage system which has a plurality of storages being capable of handling a large amount of information and a storage management apparatus which reads or writes information with readiness from or to the storages and controls power supply to the storages. The storages in the storage system may preferably have large capacities such as hard disks. In this case, the hard disks are controlled so as to reduce power consumption by turning off motors at a standby state from the viewpoint of power saving. Upon detection of an access to a storage, the storage management apparatus turns on the motor of the accessed hard disk to start and thus returns to a normal operation.

The expression "turning off" a motor refers to an operation of stopping power supply for operations by the motor. The expression "turning on" a motor refers to a series of operations from a state that the motor has an off-state to a steady state.

Thus, for example, power supply units which supply power to the motors are desired to be capable of supplying power for turning on all motors for driving respective hard disks at the same time in consideration of the case desiring starting all hard disks at the same time. Since the power desired for turning on the motors is larger than the power desired at the steady state after the motors are turned on, the power supply units have been desired to be capable of supplying a large amount of power.

However, having such power supply units with a large power supply capability is disadvantageous from viewpoints of power saving, size reduction, and cost reduction.

On the other hand, when the amount of desired power for driving the hard disks exceeds the maximum power supply capability of the power supply unit, the hard disks may be divided into a plurality of groups, and the grouped hard disks may be started at different timings.

For example, one technology may calculate the maximum number of devices, which are simultaneously operable, based on the power supply requirement for the system and the power supply capability of the system and then start the calculated maximum number of devices. (Refer to Japanese Laid-open Patent Publication No. 2000-10678, for example).

Another technology has been proposed in which a plurality of disks are formed into some groups before power-on, the power is sequentially supplied to respective groups including disks which record/reproduce data in parallel, the power being supplied to each group for a time period desired for flow of starting current. (Refer to Japanese Laid-open Patent Publication No. 4-78062, for example).

Another technology has been proposed in which power is supplied for start-up to a part of a plurality of hard disks and supplied for a standby state to the rest of the hard disks. After the start-up of the part of the hard disks, the power desired for start-up is supplied to some of the rest of the hard disks. (Refer to Japanese Laid-open Patent Publication No. 2001-186655, for example).

Power saving processing in a storage system desires both of reduction of power consumption by hard disks and securing readiness for access. However, the method of dividing hard disks into a plurality of groups and starting the groups of hard disks at different times takes a long time until the start of entire access processing and may not sufficiently satisfying the readiness for requests for access.

The problem is not limited to hard disks but may occur in a storage system employing other types of storage.

SUMMARY

According to an aspect of the invention, a storage management apparatus includes a memory for storing logical volume information for indicating a plurality of logical volumes and priority information for determining an order of the plurality of logical volumes to be activated, a first interface for connecting a plurality of storages to the storage management apparatus, at least one of the plurality of storages corresponding to one of the logical volumes, a second interface connected to a power supply unit for supplying power to the plurality of storages, and a processor for executing determining whether the power supply unit is capable of supplying power for simultaneously starting the storages corresponding to the logical volumes corresponding to an access request for accessing the logical volumes, selecting one of the logical volumes on the basis of the priority information when the power supply unit is incapable of supplying power for simultaneously starting the storages corresponding to the logical volumes corresponding to the access request, and transmitting a start request for staring the storages corresponding to the selected logical volume by using the first interface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of information to be stored in the access history storing portion according to the second embodiment;

FIG. 6 illustrates an example of information to be stored in a priority level storing portion according to the second embodiment;

FIG. 19 illustrates an example of operations by the storage system according to the second embodiment; and FIG. 20 illustrates an example of operations by the storage system according to the second embodiment.

DESCRIPTION OF EMBODIMENTS

Hereinafter, preferred embodiments will be described in detail with reference to drawings.

First Embodiment

Figure 1:
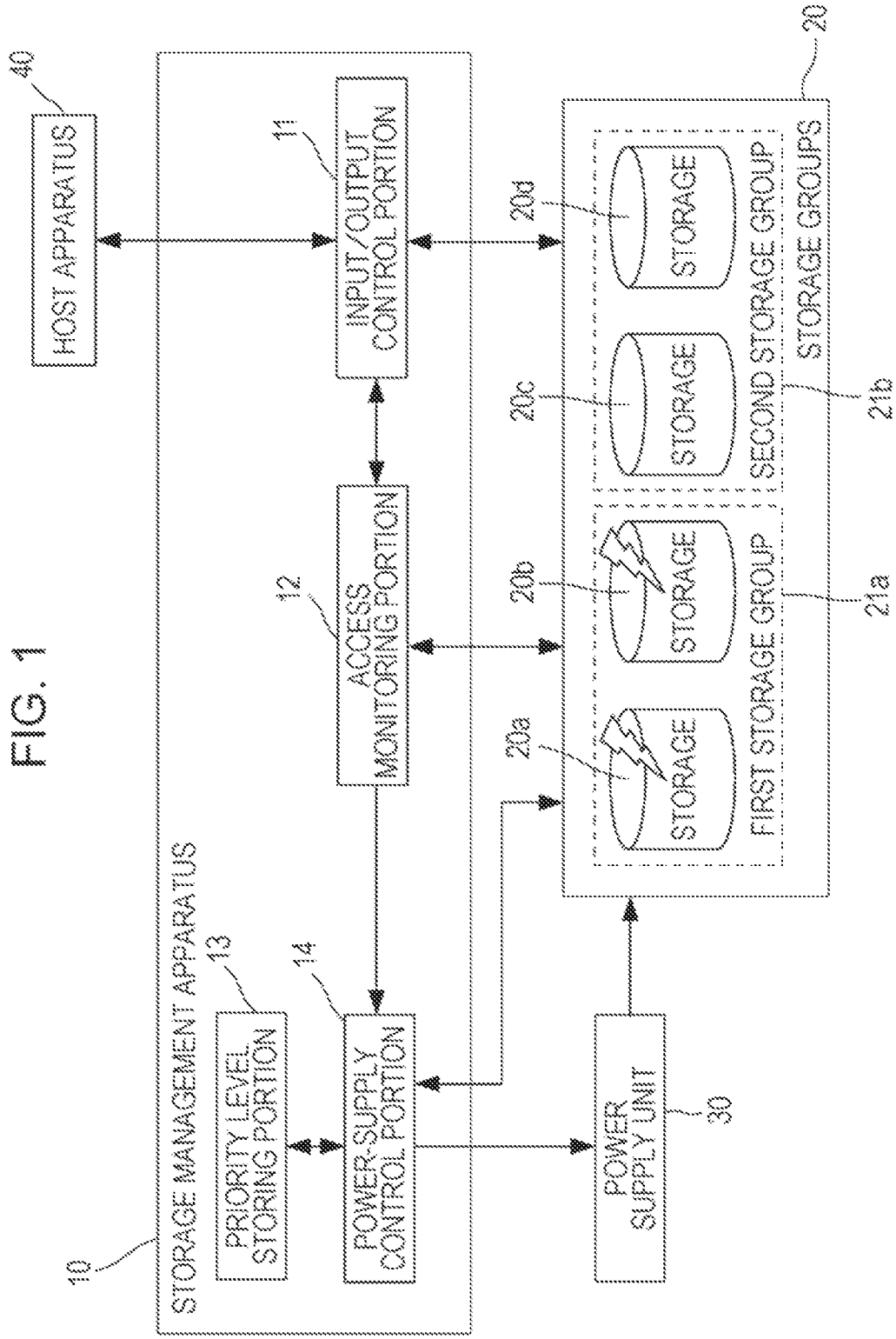
FIG. 1 illustrates an example of a storage management apparatus according to a first embodiment.

FIG. 1 illustrates an example of a storage management apparatus according to a first embodiment.

A storage management apparatus 10 is connected to storage groups 20, a power supply unit 30 which supplies power to the storage groups 20, and a host apparatus 40. The storage management apparatus 10 performs access processing to the storage groups 20 based on access requests received from the host apparatus 40 and controls the power supply unit 30 so as to control power supply to the storage groups 20.

The host apparatus 40 issues an access request to the storage management apparatus 10 for reading information stored in the storage groups 20 or writing information to the storage groups 20.

The storage groups 20 have a plurality of storages 20a, 20b, 20c, and 20d. The storage groups 20 have a plurality of storage groups 21a and 21b each of which includes one or a plurality of the storages 20a to 20d. Each of the storage groups 21a and 21b stores information. Here, in the storage groups 20, a logical volume is set for each of the plurality of storage groups 21a and 21b.

The power supply unit 30 controls power supply to the storages 20a to 20d under the control of the storage management apparatus 10. According to this embodiment, the storages 20a to 20d have either one of the states of starting, operating (activating) and stopping. In the starting state, a storage is being shifted from a stopping state to the operating state. The operating state refers to a stable state after start. In the operating state, information is written or read. The stopping state refers to a state excluding the starting state and operating state.

Next, the storage management apparatus 10 will be described. The storage management apparatus 10 has an input/output control portion 11, an access monitoring portion 12, a priority level storing portion 13, and a power-supply control portion 14.

The input/output control portion 11 receives access requests from the host apparatus 40 and, based on the received access requests, reads information stored in the storage groups 20 or writes information to the storage groups 20. The timing of the processing of reading or writing by the input/output control portion 11 is controlled by the access monitoring portion 12.

The access monitoring portion 12 monitors the input/output control portion 11 and detects the logical volumes to which the information access-requested by the host apparatus 40 belongs. The logical volumes may be detected with reference to a table having correspondence between access-requested information and the logical volume to which the information belongs, for example. The access monitoring portion 12 further monitors the operation states of the storages 20a to 20d.

When the access monitoring portion 12 detects the logical volume to which the access-requested information belongs, the access monitoring portion 12 checks the operation state of the storage group corresponding to the detected logical volume. If the corresponding storage group has the operating state, the input/output control portion 11 is caused to perform processing of reading or writing the information.

If the storage group corresponding to the detected logical volume has the stopping state, the access monitoring portion 12 performs the following processing. That is, the access monitoring portion 12 notifies the detected logical volume to the power-supply control portion 14 and instructs the power-supply control portion 14 to start the storage group corresponding to the detected logical volume. In this case, the access monitoring portion 12 instructs the input/output control portion 11 not to perform the processing of reading or writing information. After the shift by the storage group corresponding to the detected logical volumes to the operating state is detected, the input/output control portion 11 is caused to perform the processing. When the storage group corresponding to the detected logical volume has the starting state, the access monitoring portion 12 waits for the shift by the corresponding storage group to the operating state and causes the input/output control portion 11 to perform the processing if detects the shift.

The priority level storing portion 13 stores priority level information on the logical volumes set in the storage groups 21a and 21b. The priority levels are set based on the readiness of the corresponding storage groups 21a and 21b.

The power-supply control portion 14 controls the power supply unit 30 in accordance with an instruction to start a storage group from the access monitoring portion 12 and starts the storage group corresponding to the logical volumes notified from the access monitoring portion 12.

The power-supply control portion 14 is notified a plurality of logical volumes from the access monitoring portion 12. If pluralities of storage groups corresponding to the notified logical volumes are instructed to start, the following processing is performed. That is, with reference to the priority level storing portion 13 and based on the priority level information of the logical volumes stored in the priority level storing portion 13, the power-supply control portion 14 selects a part of logical volumes from the plurality of logical volumes notified from the access monitoring portion 12. The power-supply control portion 14 controls the power supply unit 30 so as to start the storage group corresponding to the selected part of logical volumes first. After the completion of the start of the selected storage groups and the shift to the operating state, the power-supply control portion 14 controls the power supply unit 30 so as to start the storage group corresponding to the rest of the logical volumes.

Next, operations by the storage management apparatus 10 will be described.

It is assumed here that the logical volume corresponding to the storage group 21a is a first logical volume, and the logical volume corresponding to the storage group 21b is a second logical volume. It is further assumed that both of the storage groups 21a and 21b have the stopping state and, under the state, the host apparatus 40 requests to read information belonging to the first logical volume and second logical volume, for example.

First of all, in response to a read request for information to the storage groups 20 by the host apparatus 40, the access monitoring portion 12 detects the first and second logical volumes to which the read-requested information belongs to. The first and second logical volumes may be detected with reference to a table having correspondence between access-requested information and the logical volume to which the information belongs, for example. The access monitoring portion 12 checks the operation states of the storage groups 21a and 21b corresponding to the detected first and second logical volumes.

Since both of the storage groups 21a and 21b have the stopping state, the access monitoring portion 12 notifies the power-supply control portion 14 of the read-requested first and second logical volumes and instructs the power-supply control portion 14 to start the storage groups 21a and 21b. In this case, the access monitoring portion 12 instructs the input/output control portion 11 not to perform the read processing on the information.

Next, the power-supply control portion 14 selects one logical volume from the first and second logical volume in accordance with the instruction to start the storage groups 21a and 21b from the access monitoring portion 12, with reference to the priority level storing portion 13 and based on the priority level information on the logical volume stored in the priority level storing portion 13. It is assumed here that the first logical volume has a higher priority level than the second logical volume, and the power-supply control portion 14 selects the first logical volume.

Next, the power-supply control portion 14 controls the power supply unit 30 so as to start the storage group 21a corresponding to the selected first logical volume first.

After the completion of the start of the storage group 21a and the shift to the operating state, the access monitoring portion 12 causes the input/output control portion 11 to perform processing of writing information belonging to the first logical volume. After the completion of the start of the storage group 21a and the shift to the operating state, the power-supply control portion 14 controls the power supply unit 30 so as to start the storage group 21b corresponding to the second logical volume. After the completion of the start of the storage group 21b and shift to the operating state, the access monitoring portion 12 causes the input/output control portion 11 to perform processing of writing information belonging to the second logical volume.

In this way, the storage management apparatus 10 starts the storage groups serially based on the priority levels of the logical volumes to which the access-requested information belongs to. Thus, when a plurality of access requests are issued, priority may be given to an access request at a higher-readiness level in processing. This may improve the readiness requested for the accesses.

Next, a second embodiment will be described in which a storage management apparatus 10 is applied to a storage system having storage groups being RAIDs (redundant arrays of inexpensive disks).

Figure 2:
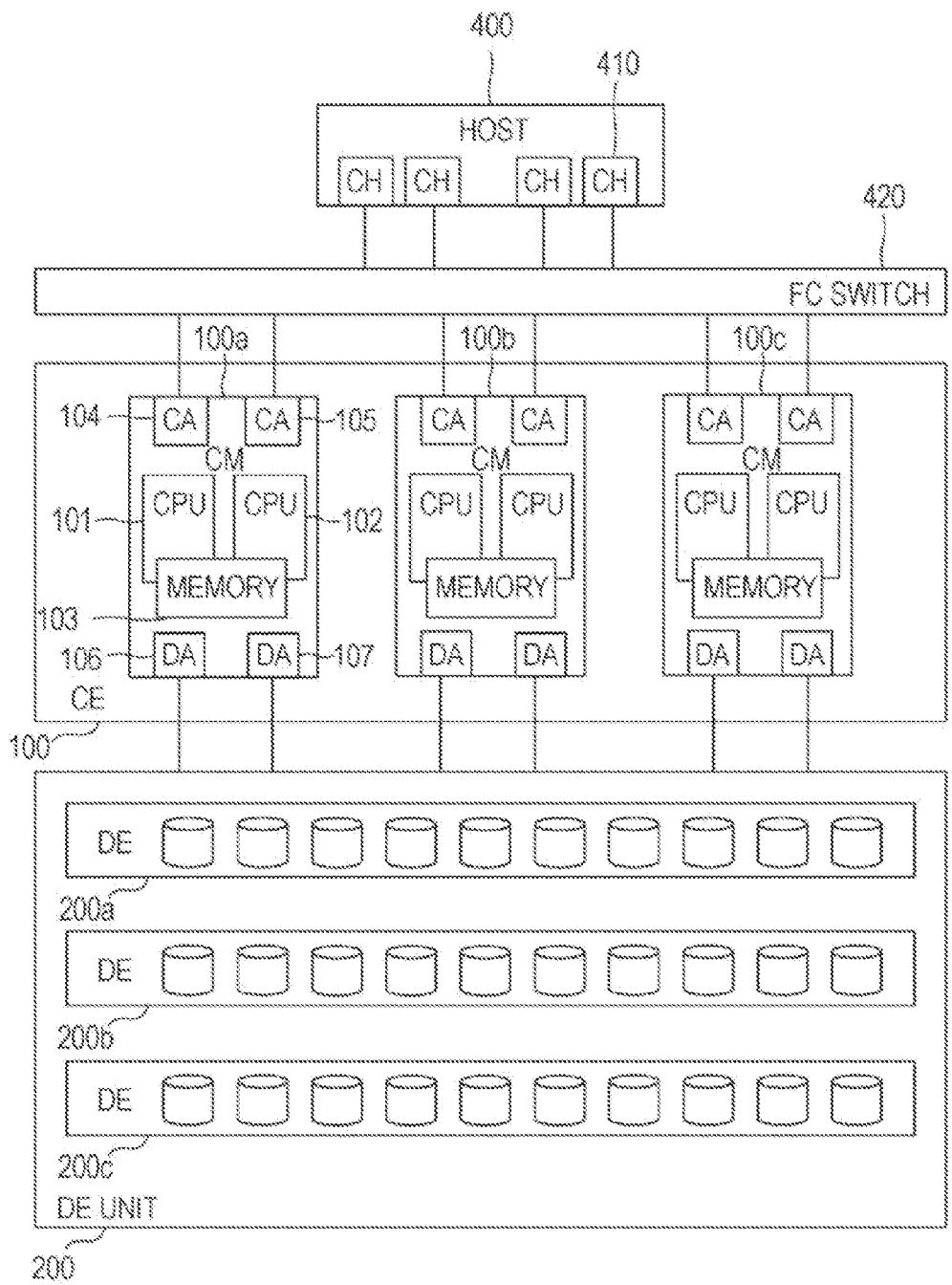
FIG. 2 illustrates an example of hardware of a storage system according to the second embodiment.

FIG. 2 illustrates an example of hardware of a storage system according to the second embodiment.

The storage system includes a host computer (HOST) 400 and a device enclosure unit (DE unit) 200 having a plurality of device enclosures (DEs) 200a, 200b, and 200c each of which implements a storage group. The storage system further includes a controller enclosure (CE) 100 implementing a plurality of controller modules (CM) 100a, 100b, and 100c. The device enclosures 200a to 200c may be disk enclosures including hard disks as storages of storage groups, for example.

The host computer 400 includes a plurality of channels (CH) 410. The channels 410 are connected to the controller modules 100a to 100c via fiber channels. The connections between the channels 410 and the controller modules 100a to 100c are controlled by a fiber channel switch (FC switch) 420.

The controller enclosure 100 of this embodiment has three controller modules (controller modules 100a to 100c) in the example in FIG. 2 but, without limiting thereto, may have an arbitrary number of controller modules.

The storage system of this embodiment has three device enclosures (such as the device enclosures 200a to 200c) but, without limiting thereto, may have an arbitrary number of device enclosures.

Next, the device enclosures 200a to 200c will be described. The device enclosure 200a will be described below as a typical example.

Figure 3:
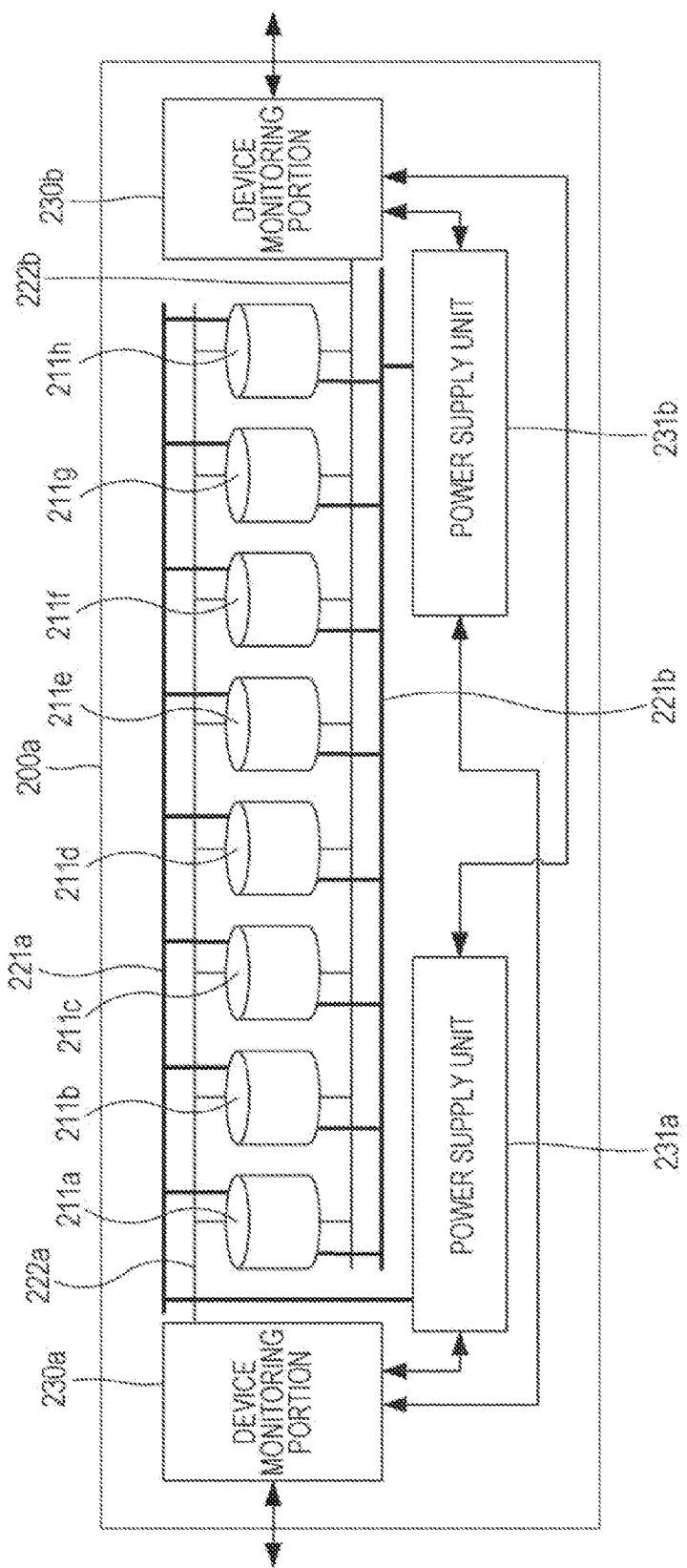
FIG. 3 illustrates an example of a device enclosure according to the second embodiment.

FIG. 3 illustrates an example of a device enclosure according to the second embodiment.

The device enclosure 200a includes a plurality of storages 211a, 211b, 211c, 211d, 211e, 211f, 211g, and 211h and a plurality of power supply units 231a and 231b which supply power to the storages 211a to 211h via power supply paths 221a and 221b. The device enclosure 200a further includes a plurality of device monitoring portions 230a and 230b which are connected to the storages 211a to 211h through input/output paths 222a and 222b.

The storages 211a to 211h receive power supply from both of the power supply units 231a and 231b. Here, the storages 211a to 211h are hard disks which operate with motors. However, without limiting thereto, the storages 211a to 211h may be non-volatile semiconductor memories such as a Flash SSD (solid state drive) or other storage devices which may store data, for example.

The power supply units 231a and 231b have a normal mode in which a normal amount of power is supplied and a high power mode in which more power than that in the normal mode is supplied. The power supply units 231a and 231b are capable of supplying sufficient power for simultaneously operating all of the storages 211a to 211h included in the device enclosure 200a and simultaneously starting a specific number of storages of all of the storages 211a to 211h.

The power supply units 231a and 231b are not capable of supplying power for simultaneously starting all of the storages 211a to 211h included in the device enclosure 200a.

Thus, the costs for the power supply units 231a and 231b may be reduced, and the power consumption by the device enclosure 200a may be reduced.

The device monitoring portions 230a and 230b perform the following processing under the control of the controller modules 100a to 100c. That is, the device monitoring portions 230a and 230b read or write information stored in the storages 211a to 211h. The device monitoring portions 230a and 230b monitor the storages 211a to 211h and detect the operation states (operating, starting and/or stopping) of the storages 211a to 211h. The device monitoring portions 230a and 230b monitor the power supply units 231a and 231b, and detect the operation modes of the power supply units 231a and 231b, and detect a failure. The device monitoring portions 230a and 230b detects the maximum amount of power which may be supplied by the power supply units 231a and 231b and the current amount of power consumption by the power supply units 231a and 231b.

The other device enclosures 200b and 200c also have the same structure as the device enclosure 200a.

The device enclosure unit 200 including the device enclosures 200a to 200c may have a RAID structure which divides and stores information such as user information into a plurality of storages of the storages included in the device enclosures 200a to 200c or stores the same information to the plurality of storages, for example.

The device enclosure unit 200 includes a plurality of RAID groups including one or a plurality of storages of the storages included in the device enclosures 200a to 200c. Here, in the device enclosure unit 200, logical volumes are set for the RAID groups. While the RAID groups are matched with the logical volumes, one logical volume may include a plurality of RAID groups or a plurality of logical volumes may be provided within one RAID group without limiting thereto. The device enclosures 200a to 200c have eight storages (storages 211a to 211h) but, without limiting thereto, may have an arbitrary number of storages.

Referring back to FIG. 2, the controller modules 100a to 100c will be described next. Here, the controller module 100a will be described as a typical example.

The controller module 100a is entirely controlled by central processing units (CPUs) 101 and 102. To the CPUs 101 and 102, a memory 103, channel adapters (CAs) 104 and 105, and device adapters (DAs) 106 and 107 are connected via an internal bus. The memory 103 temporarily stores at least a part of programs to be executed by the CPUs 101 and 102. The memory 103 is a shared memory and stores data desired for processing by the CPUs 101 and 102.

The channel adapters 104 and 105 are connected to channels 410 in a host computer 400 through an FC switch 420. The channel adapters 104 and 105 transmit and receive data to and from the channels 410 in accordance with instructions from the CPUs 101 and 102. The device adapters 106 and 107 are connected to the device enclosures 200a to 200c in the device enclosure unit 200. The device adapters 106 and 107 transmit and receive data to and from the device enclosures 200a to 200c in accordance with instructions by the CPUs 101 and 102.

The other controller modules 100b and 100c also have the same structure as the controller module 100a.

This hardware configuration may implement the processing functions of the controller module 100a to 100c.

Next, functions of the controller modules 100a to 100c will be described.

Figure 4:
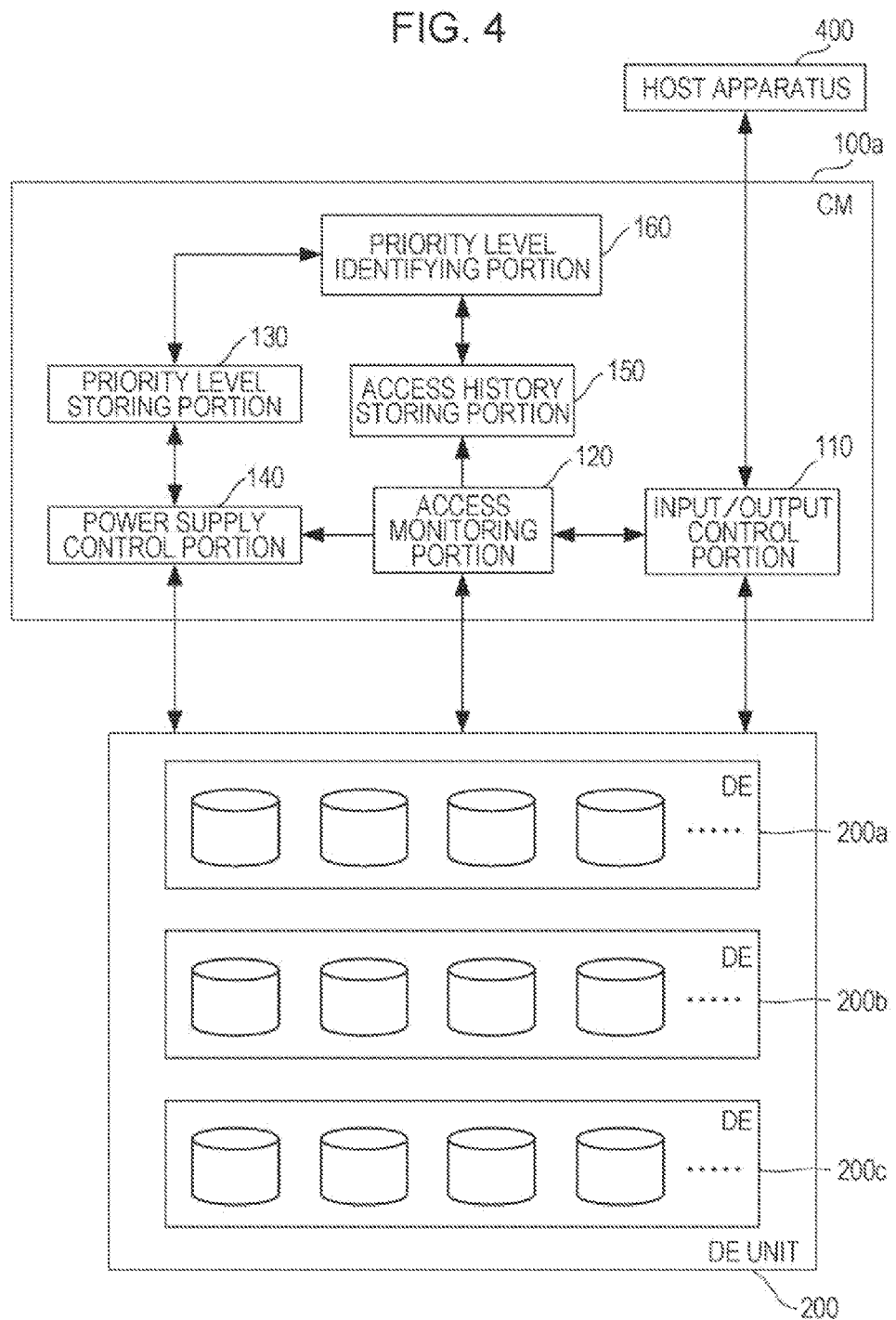
FIG. 4 is a block diagram illustrating an example of a function of a controller module according to the second embodiment.

FIG. 4 is a block diagram illustrating an example of a function of a controller module according to the second embodiment. The controller module 100a will be described here as a typical example. The controller modules 100b and 100c have the same structure as the controller module 100a.

The controller module 100a has an input/output control portion 110, an access monitoring portion 120, a priority level storing portion 130, a power-supply control portion 140, an access history storing portion 150, and a priority level determining portion 160.

The input/output control portion 110 receives an access request from the host computer 400 and, based on the received access request, performs processing of reading information stored in the device enclosure unit 200 or writing information to the device enclosure unit 200. The timing for the processing of reading or writing by the input/output control portion 110 is controlled by the access monitoring portion 120.

The access history storing portion 150 stores access history information on logical volumes set in the corresponding RAID groups.

The access monitoring portion 120 monitors the input/output control portion 110 and detects the logical volume to which the information access-requested by the host computer 400 belongs. The logical volume may be detected with reference to a table having correspondence between access-requested information and the logical volume to which the information belongs, for example. Based on the detection of the logical volume, the access monitoring portion 120 updates the access history information corresponding to the detected logical volume stored in the access history storing portion 150. The access monitoring portion 120 further monitors the operation states of the storages in the device enclosures 200a to 200c.

If the access monitoring portion 120 detects the logical volume to which the access-requested information belongs is detected, the access monitoring portion 120 checks the operation state of the RAID group corresponding to the detected logical volume. If the corresponding RAID group has the operating state, the access monitoring portion 120 causes the input/output control portion 110 to perform processing of reading or writing information. If the corresponding RAID group has the stopping state, the access monitoring portion 120 performs the following processing.

In other words, the access monitoring portion 120 notifies the power-supply control portion 140 of the detected logical volume and instructs the power-supply control portion 140 to start the RAID group corresponding to the detected logical volume. In this case, the access monitoring portion 120 controls the input/output control portion 110 so as not to perform processing of reading or writing information. After detecting the shift to the operating state by the RAID group corresponding to the detected logical volume, the access monitoring portion 120 causes the input/output control portion 110 to perform the processing. If the RAID group corresponding to the detected logical volume has the starting state, the access monitoring portion 120 waits for the shift to the operating state by the corresponding RAID group and causes the input/output control portion 110 to perform the processing if detects the shift. The input/output control portion 110 stores a flag indicating whether the processing of reading or writing information is to be allowed to perform or not. Based on the flag, the processing is performed. Updating the flag by the access monitoring portion 120 may control the input/output control portion 110 so as to or not to perform the processing of reading or writing information.

The priority level storing portion 130 stores information including priority level information indicating the priority levels for logical volumes set in the RAID groups and storage type information indicating the types of storages included in the RAID groups.

The priority level determining portion 160 calculates the access frequencies to logical volumes based on the access history information stored in the access history storing portion 150. The priority level determining portion 160 further acquires the storage type information stored in the priority level storing portion 130. The priority level determining portion 160 compares the calculated access frequencies and acquired storage type information between the logical volumes and assigns priority levels to the logical volumes such that the logical volumes of storage types having high access frequencies and desiring high readiness may have higher priority levels. Based on the priority levels, the priority level determining portion 160 updates priority level information indicating the priority levels of the logical volumes stored in the priority level storing portion 130.

In accordance with an instruction to start a RAID group from the access monitoring portion 120, the power-supply control portion 140 controls the device monitoring portions 230a and 230b in the device enclosure unit 200 so as to start the storages included in the RAID group corresponding to the logical volume notified by the access monitoring portion 120.

In order to start a RAID group, the power-supply control portion 140 further compares the number of storages to be started and the number of operable storages with a normal amount of power in the device enclosures 200a to 200c. Based on the comparison results, the power-supply control portion 140 determines whether the storages to be started are operable with a normal amount of power or not. The normal amount of power here refers to the amount of power supplied when all of the power supply units in the device enclosures 200a to 200c have the normal mode. For the device enclosures 200a to 200c including more storages to be started than the operable storages with the normal amount of power and including the storages that are operable with the normal amount of power, the power-supply control portion 140 sets the power supply unit or units to the normal mode and start the storages included in the target RAID group. For the device enclosures 200a to 200c including the number of storages to be started that is higher than the number of operable storages and including storages that are not operable with the normal amount of power, the power-supply control portion 140 sets one or both of the power supply units within the device enclosures to the high power mode as desired, and the storages included in the RAID group are started.

The power-supply control portion 140 receives the notification of a plurality of logical volumes from the access monitoring portion 120. If pluralities of RAID groups corresponding to the notified logical volumes are instructed to start, the following processing is performed.

In other words, for the device enclosures 200a to 200c having a plurality of RAID groups corresponding to the notified plurality of logical volumes in the device enclosure unit 200, the power-supply control portion 140 accesses the device monitoring portions 230a and 230b and calculates the number of operable storages.

The number Y of operable storages of the target device enclosures 200a to 200c may be calculated by the power-supply control portion 140 as follows, for example:

$Y$=(maximum amount of power of device enclosure−current amount of power consumption of device enclosure)/starting power for one storage Where the maximum amount of power of a device enclosure refers to the maximum amount of power that may be supplied to a power supply unit within a device enclosure. The maximum amount of power of a device enclosure and the current amount of power consumption of a device enclosure may be acquired by the power-supply control portion 140 by accessing the device monitoring portions 230a and 230b for the target device enclosures 200a to 200c.

The power-supply control portion 140 then determines whether all of the plurality of RAID groups to be accessed may be simultaneously started or not in accordance with the calculated number of operable storages. The determination may be performed by using the current number of started storages and the number of storages desired to start in accordance with access in accessing based on a specific maximum number of operable storages. If all of the Raid groups may be simultaneously started, the power-supply control portion 140 simultaneously starts all of the plurality of RAID groups to be accessed. If all of the RAID groups are difficult to simultaneously start, the power-supply control portion 140 selects a logical volume with a high priority level from the plurality of logical volumes notified by the access monitoring portion 120 with reference to the priority level storing portion 130 and based on priority level information stored in the priority level storing portion 130. After starting the RAID group corresponding to the selected logical volume, the power-supply control portion 140 starts the RAID group corresponding to the rest of the logical volumes.

In order to start a RAID group, the power-supply control portion 140 further monitors the number of power supply units desired to operate in the high power mode among all power supply units in the device enclosure unit 200. The power-supply control portion 140 does not start the RAID group if the number of power supply units desired to operate in the high power mode is equal to or lower than an upper limit number.

The upper limit number (X) of the number of the power supply units to be operated in the high power mode may be calculated by the power-supply control portion 140 as follows, for example:

$X$=(the maximum amount of power in device enclosure unit 200−current amount of power consumption in device enclosure unit 200)÷(the maximum amount of power in high power mode in power supply unit−amount of power in normal mode in power supply unit)

Where the maximum amount of power in the device enclosure unit 200 refers to the maximum amount of power which may be supplied by a power supply unit provided within the device enclosure unit 200. The current amount of power consumption in the device enclosure unit 200 may be acquired by the power-supply control portion 140 by accessing the device monitoring portions 230a and 230b in the device enclosure unit 200.

Next, information to be stored by the access history storing portion 150 will be described.

FIG. 5 illustrates an example of information to be stored in the access history storing portion according to the second embodiment.

The access history storing portion 150 stores an access history table 150a having access history information associated with access ranks A to D for every 30 minutes regarding logical volumes RLU #0, #1, #2, #3, #4 . . . set for RAID groups. Here, the access ranks A to D refer to frequencies of access requests, and A, B, C and D are given in the decreasing order of frequency.

The access history table 150a illustrates that logical volumes RLU#0 and RLU#2 are frequently accessed and the logical volumes RLU#1 is less accessed. The access history table 150a further illustrates that the frequencies of access to the logical volumes RLU#3 and RLU#4 increase with the passage of time.

Next, information to be stored in the priority level storing portion 130 will be described.

FIG. 6 illustrates an example of information to be stored in a priority level storing portion according to the second embodiment.

The priority level storing portion 130 stores a Tier level to be used for selecting a logical volume by the power-supply control portion 140, Status, ECO Flag, and Motor Status to be used for controlling the start, operation, and stop of storages, Tier Level (Base) and Disk Type to be used for assigning a priority level by the priority level determining portion 160.

The priority level storing portion 130 stores an apriority level table 130a having priority level information (Tier Level) associated with priority levels for the logical volumes RLU#0, RLU#1, RLU#2, RLU#3, RLU#4 and . . . set for RAID groups. The Tier Levels are indicated by numbers of 0, 1, 2, 3, 4 . . . in the decreasing order of priority level. A Tier Level is set by the priority level determining portion 160 based on the Tier Level (Base) and the access frequency of the corresponding logical volume. For example, since the RLU#0 on the priority level table 130a has a Tier Level (Base) of 0, and the access frequency is high, the Tier Level keeps 0. Though the RLU#1 has a Tier Level (Base) of 3, the access frequency is low. Thus, the priority level drops by one, and the Tier Level is 4.

The priority level table 130a illustrates that the logical volumes RLU#0 has the highest priority level and the logical volumes RLU#2 and RLU#3 have the next highest priority levels.

In correspondence with the logical volumes RLU#0 and so on, the priority level table 130a has a state (Status) of the corresponding RAID group, a setting (ECO Flag) for power saving, and an operation state (Motor Status) of a motor for the corresponding RAID group. In correspondence with the logical volumes RLU#0 and so on, the priority level table 130a has reference priority level information (Tier Level (Base)), and type information (Disk Type) of a storage (such as storages 211a to 211h) included in the corresponding RAID group.

Status is "Available" when the RAID group has the normal state, for example. When an error occurs in the RAID group, Status becomes "Broken". When a maintenance part is built in the RAID group, Status becomes "Rebuild".

ECO Flag may be "Off" when the power saving mode is not used, for example and become "On" when the power saving mode is used.

For example, Motor Status is "On" when a motor has the operating state, On Progress when a motor is starting, "Off" when a motor stops, and Off Progress when a motor is shifting to the stopping state.

The Tier Level (Base) indicates a reference priority level for logical volumes and is set based on the type and/or application of storages in the corresponding RAID group in setting a logical volume. The Tier Levels (Base) are indicated by numbers of 0, 1, 2, 3, 4 . . . in the decreasing order of priority level. In other words, the higher the readiness of the type and/or application of storages are, the higher the set priority level is.

Disk Types may include, here, SSD (Solid State Drive), FC (Fibre Channel)/SAS (Serial Attached SCSI), and SATA (Serial ATA), for example. Disk Type is used for determining the readiness of logical volumes in setting the Tier Level (Base). In other words, a logical volume of Disk Type with high readiness is set to have s high Tier Level (Base).

Next, a processing routine by the controller module 100a will be described.

Figure 7:
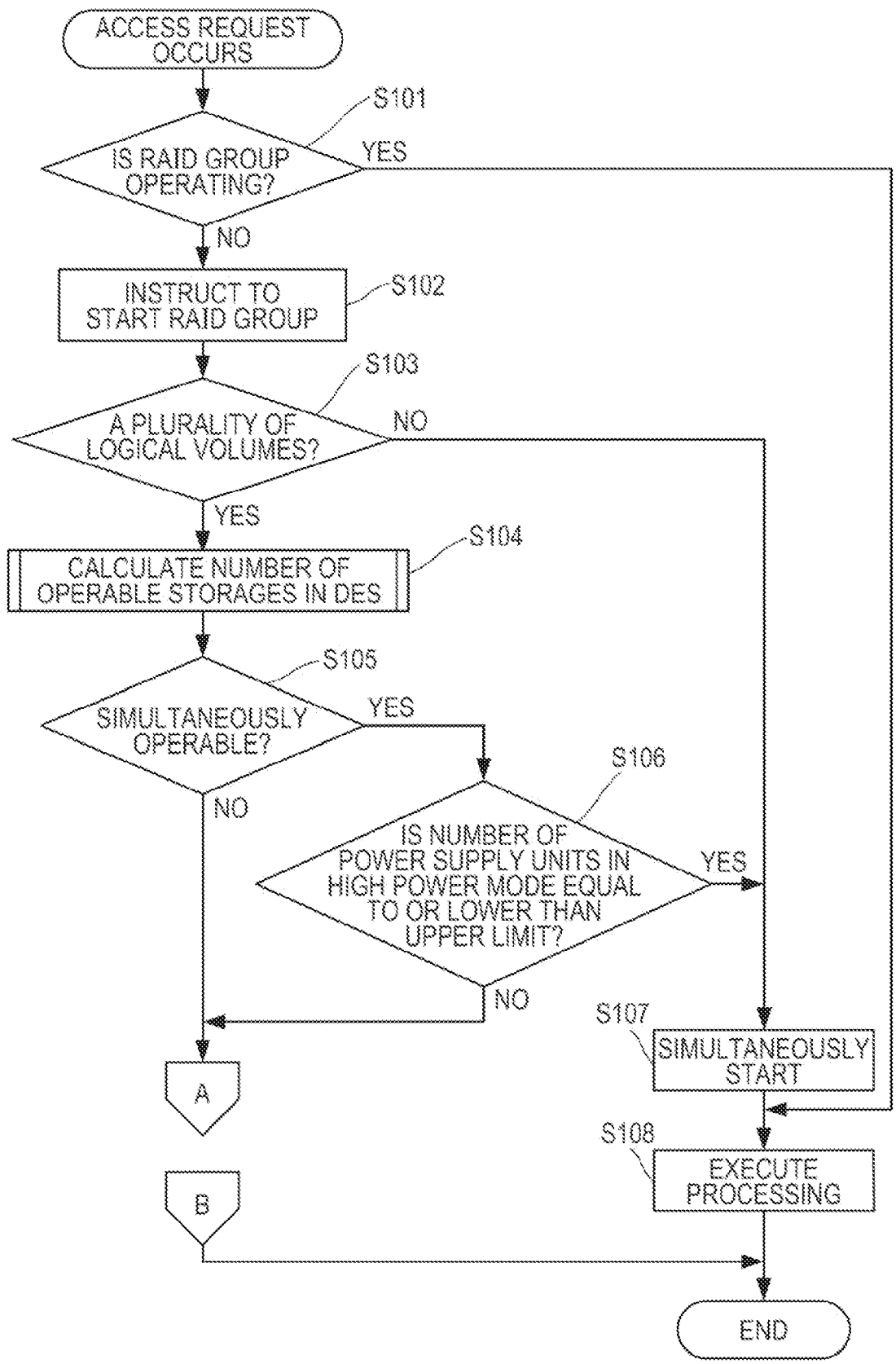
FIG. 7 is a flowchart illustrating an example of a processing routine by a controller module according to the second embodiment.
Figure 8:
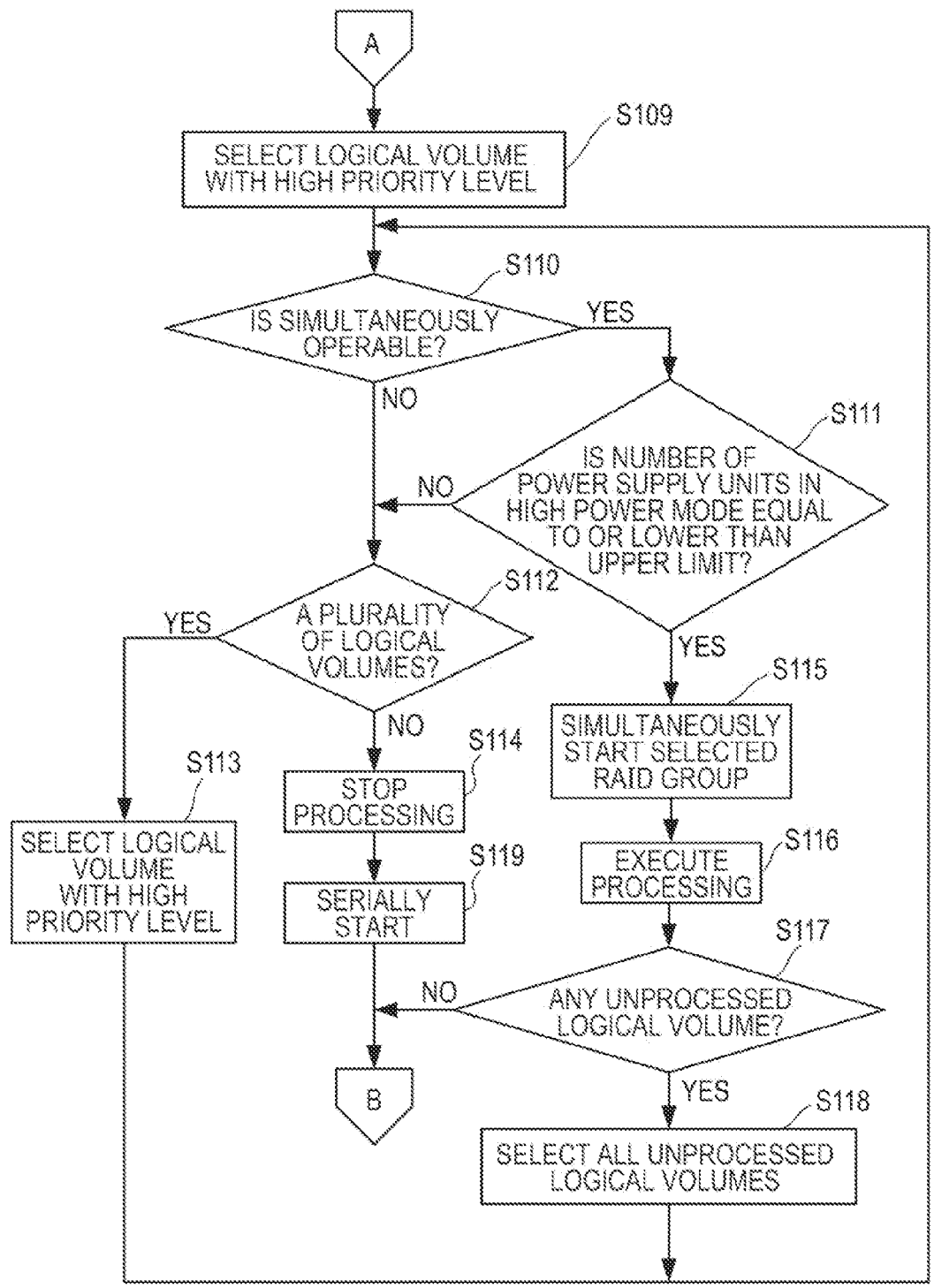
FIG. 8 is a flowchart illustrating an example of a processing routine by the controller module according to the second embodiment.
Figure 9:
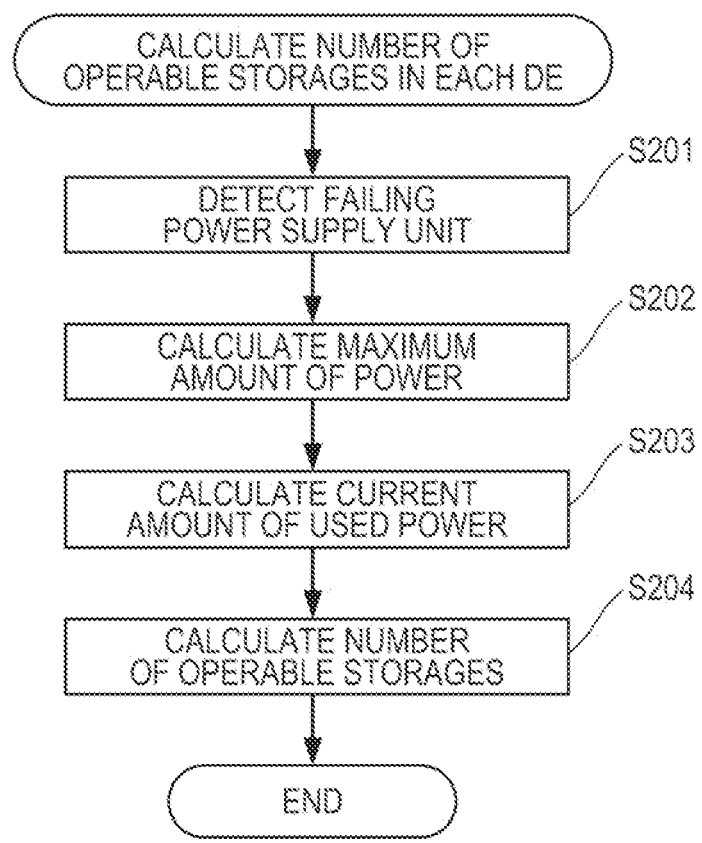
FIG. 9 is a flowchart illustrating an example of a processing routine by the controller module according to the second embodiment.

FIG. 7, FIG. 8, and FIG. 9 are flowcharts illustrating examples of the processing routine by a controller module according to the second embodiment.

First of all, a processing routine will be described with reference to FIG. 7.

The following processing is started in response to the occurrence of an access request from the host computer 400 to the controller module 100a.

[S101] The access monitoring portion 120 detects the logical volume to which the access-requested information belongs and determines whether the RAID group corresponding to the detected logical volume is operating or not. The logical volume may be detected with reference to a table having correspondence between access-requested information and the logical volume to which the information belongs, for example. Whether the RAID group corresponding to the detected logical volume is operating or not may be determined with reference to a table having correspondence between logical volumes and the operation states of their corresponding RAID groups, for example. If the RAID group is not operating, the processing moves to S102. If the RAID group is operating, the processing moves to S108.

[S102] The access monitoring portion 120 instructs the power-supply control portion 140 to start the RAID group corresponding to the logical volume detected in S101 and notifies the detected logical volume.

[S103] The power-supply control portion 140 determines whether pluralities of logical volumes are notified from the access monitoring portion 120 in S102 or not. The determination may be performed by the power-supply control portion 140 by counting the number of times of notification of the logical volumes from the access monitoring portion 120, for example. If pluralities of logical volumes have been notified, the processing moves to S104. If pluralities of logical volumes are not notified, the processing moves to S107.

[S104] The power-supply control portion 140 calculates the current number of operable storages for the device enclosures 200a to 200c having storages included in the plurality of RAID groups corresponding to the plurality of logical volumes determined in S103.

[S105] Based on the number of operable storages calculated in S104, the power-supply control portion 140 determines whether the plurality of RAID groups corresponding to the plurality of logical volumes determined in S103 may be simultaneously started or not. For example, if the number of storages to be started is equal to or lower than the number of operable storages, it is determined that the storages may be simultaneously started. If the number of storages to be started is higher than the number of operable storages, it is determined that they may not be simultaneously started. If the plurality of RAID groups may be simultaneously started, the processing moves to S106. If it is difficult to simultaneously start the plurality of RAID groups, the processing moves to S109 in FIG. 8.

[S106] The power-supply control portion 140 determines whether the number of power supply units to be operated in the high power mode for simultaneous starting the plurality of RAID groups determined as simultaneous operable in S105 is equal to or lower than an upper limit number or not. Before the determination, whether the high power mode is desired or not is determined for the device enclosures 200a to 200c, and the number of power supply units desired to operate in the high power mode for the device enclosures desiring the high power mode is determined. If the number of power supply units desired to operate in the high power mode is equal to or lower than the upper limit number, the processing moves to S107. If the number of power supply units desired to operate in the high power mode is not equal to or lower than the upper limit number, the processing moves to S109 in FIG. 8.

[S107] The power-supply control portion 140 simultaneously starts the plurality of RAID groups determined as simultaneously operable in S105.

[S108] The access monitoring portion 120 causes the input/output control portion 110 to process the information belonging to the logical volumes detected in S101 and ends the processing.

From this point, the processing routine will be described with reference to FIG. 8.

[S109] The power-supply control portion 140 selects a part of logical volumes with higher priority levels from the plurality of logical volumes determined in S103 based on the priority level information (Tier Levels) stored in the priority level storing portion 130.

It is assumed here that the logical volumes excluding a logical volume with the lowest priority level among the plurality of logical volumes is selected. In other words, for example, if three logical volumes exist, two higher-priority-level logical volumes are selected.

[S110] The power-supply control portion 140 determines whether the RAID groups corresponding to the logical volumes selected in S109, S113 or S118 are simultaneously operable or not. The details of S113 and S118 will be described below. If the RAID groups are simultaneously operable, the processing moves to S111. If the RAID groups are not simultaneously operable, the processing moves to S112.

[S111] The power-supply control portion 140 determines whether the number of power supply units to be operated in the high power mode desired for simultaneously starting the RAID groups determined as simultaneously operable in S110 is equal to or lower than the upper limit number or not. Before the determination, whether the high power mode is desired or not is determined for the device enclosures 200a to 200c. For the device enclosures desiring the high power mode, the number of power supply units desired to operate in the high power mode is determined. If the number of the power supply units to be operated in the high power mode is equal to or lower than the upper limit number, the processing moves to S115. If the number of the power supply units to be operated in the high power mode is not equal to or lower than the upper limit number, the processing moves to S112.

[S112] The power-supply control portion 140 determines whether a plurality of logical volumes corresponding to the RAID groups determined regarding whether they are simultaneously operable or not in S110 exist or not. If so, the processing moves to S113. If not, the processing moves to S114.

[S113] The power-supply control portion 140 selects a part of logical volumes with high priority levels among the plurality of logical volumes based on the priority level information (Tier Levels) stored in the priority level storing portion 130. It is assumed there that the logical volumes excluding the logical volume with the lowest priority level are selected from the plurality of logical volumes. In other words, for example, if three logical volumes exist, two higher-priority-level logical volumes are selected.

[S114] The power-supply control portion 140 instructs the access monitoring portion 120 to stop the processing. The access monitoring portion 120 causes the input/output control portion 110 to stop the processing and ends the information processing. Then, the processing routine moves to S119. In other words, in this case, since storages are not simultaneously operable in RAID group units, the information processing ends.

[S115] The power-supply control portion 140 simultaneously starts the RAID groups determined as simultaneously operable in S110.

[S116] The access monitoring portion 120 causes the input/output control portion 110 to perform processing on the information belonging to the logical volumes corresponding to the RAID groups started in S115.

[S117] The power-supply control portion 140 determines whether any logical volume has not been processed in S116 among the plurality of logical volumes determined in S103 or not. If some logical volume has not been processed, the processing routine moves to S118. If all logical volumes have been processed, the processing ends.

[S118] The power-supply control portion 140 selects all of the logical volumes not processed in S116 among the plurality of logical volumes determined in S103.

[S119] The power-supply control portion 140 serially starts the RAID groups corresponding to the logical volumes finishing the information processing in S114.

Next, the routine of calculating the number of operable storages in the device enclosures 200a to 200c in S104 will be described with reference to FIG. 9.

[S201] The power-supply control portion 140 determines whether the power supply units in the device enclosures 200a to 200c to be started have any error or not.

[S202] In consideration of an error in the power supply unit or units determined in S201, the power-supply control portion 140 calculates the maximum amounts of power of the device enclosures 200a to 200c to be started. The maximum amounts of power of the device enclosures 200a to 200c refer to the maximum amounts of power which may be supplied by the power supply units provided in the device enclosures 200a to 200c.

[S203] The power-supply control portion 140 calculates the current amounts of power consumption in the device enclosures 200a to 200c to be started.

[S204] The power-supply control portion 140 subtracts the amounts of power consumption calculated in S203 from the maximum amounts of power calculated in S202 for the device enclosures 200a to 200c. The numbers of currently operable storages are calculated that difference values are divided by the amount of power for starting one storage.

Having described that S203 is performed after S202, S202 may be performed after S203, or S202 and S203 may be performed concurrently.

Next, a processing routine by the priority level determining portion 160 will be described.

Figure 10:
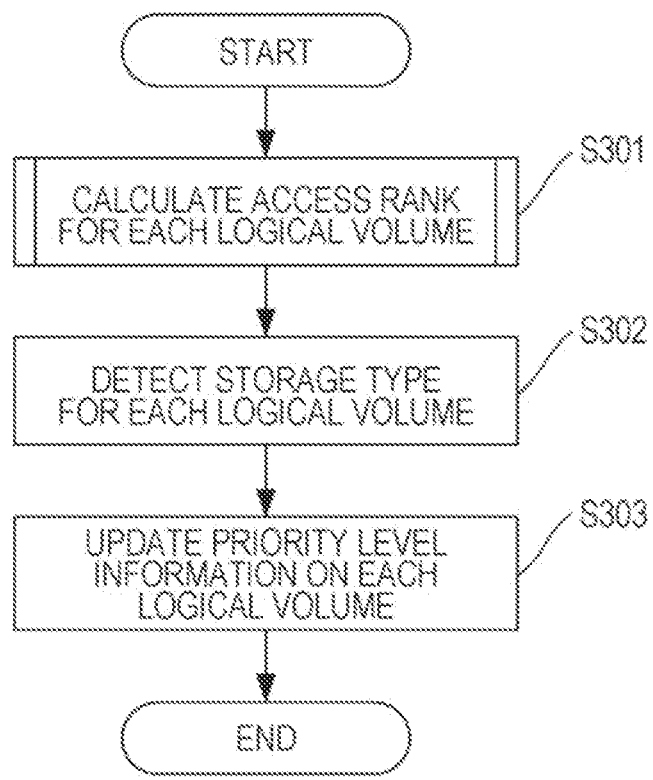
FIG. 10 is a flowchart illustrating an example of a processing routine by a priority level determining portion according to the second embodiment.
Figure 11:
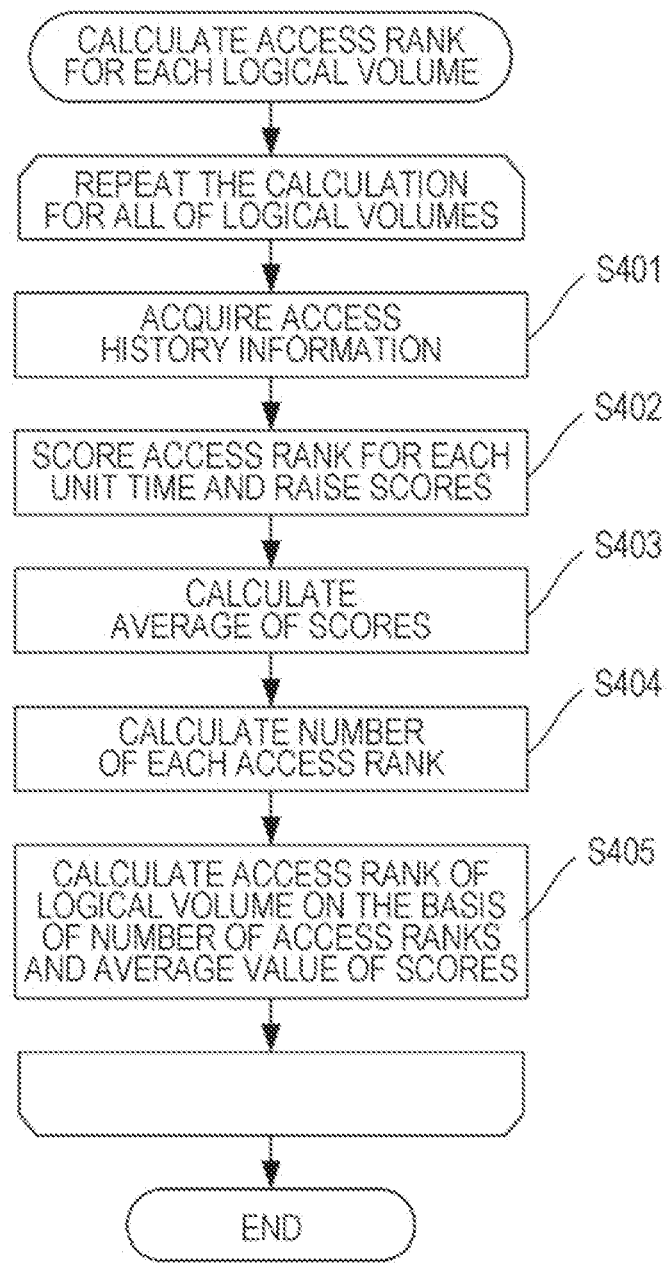
FIG. 11 is a flowchart illustrating an example of the processing routine by the priority level determining portion according to the second embodiment.

FIG. 10 and FIG. 11 are flowcharts illustrating examples of a processing routine by a priority level determining portion according to the second embodiment.

The following processing is started in time intervals of a preset operating time. Without limiting thereto, processing by the priority level determining portion may be started in response to access from the power-supply control portion 140 to the priority level storing portion 130.

[S301] The priority level determining portion 160 calculates access ranks of logical volumes based on access history information stored in the access history storing portion 150. The Operational Ranks in the access history table 150a in FIG. 5 refer to unit access ranks for each specific period of time. In other words, the access rank is calculated in consideration of rank shift condition from the unit access ranks.

[S302] The priority level determining portion 160 detects the storage type information (Disk Type) of the logical volumes with reference to the priority level storing portion 130. At the same time, the reference priority level information (Tier Level (Base)) may also be detected. The reference priority level information (Tier Level (Base)) is used as a reference value for the priority levels of logical volumes in order to determine priority levels.

[S303] The priority level determining portion 160 updates the priority level information (Tier Level) on logical volumes stored in the priority level storing portion 130 based on the access ranks calculated in S301 and the storage type information (Disk Type) detected in S302, and ends the processing. The priority level information (Tier Level) may be updated by comparing the calculated access frequency and acquired storage type information between logical volumes and assigning priority levels to the logical volumes such that the logical volumes of a storage type with higher access frequencies and desiring higher readiness may have higher priority levels.

Having described that S302 is performed after S301, S301 may be performed after S302, or S301 and S302 may be performed concurrently.

Next, a routine of calculating an access rank of each of the logical volumes in S301 will be described with reference to FIG. 11.

The processing in S401 to S405 is repeated for all logical volumes.

[S401] The priority level determining portion 160 acquires access history information from the access history storing portion 150.

[S402] The priority level determining portion 160 add scored access ranks for time zones from the access history information acquired in S401.

[S403] The priority level determining portion 160 calculates the average value of the scores added in S402. Here, the average value refers to an average score for each unit time.

[S404] The priority level determining portion 160 calculates the number of each access ranks from the access history information acquired in S401.

[S405] The priority level determining portion 160 calculates the access ranks of the logical volumes based on the average value calculated in S403 and the number of each access rank calculated in S404 and ends the processing. In other words, the higher the average value and the number of higher access ranks of the logical volumes, the higher the access rank to be given.

Next, operations by the storage system will be described with reference to the following cases, for example.

FIG. 12 to FIG. 20 illustrates examples of operations by a storage system according to the second embodiment.

It is assumed here that the maximum number of storages which are operable when the power supply units are in the normal mode in the device enclosures 200a to 200c is "3" and that the maximum number of storages which are operable when the power supply units are in the high power mode is "6". These numbers are only examples, and the maximum number of storages which are operable when the power supply units are in the normal mode and the maximum number of storages which are operable when the power supply units are in the high power mode may be set arbitrarily as desired.

The power supply units of this embodiment supply power in two modes of the normal mode and the high power mode. However, without limiting thereto, the power supply units may operate in three or more modes regarding the maximum number of operable storages or may operate only in one mode.

[Case 1]

Figure 12:
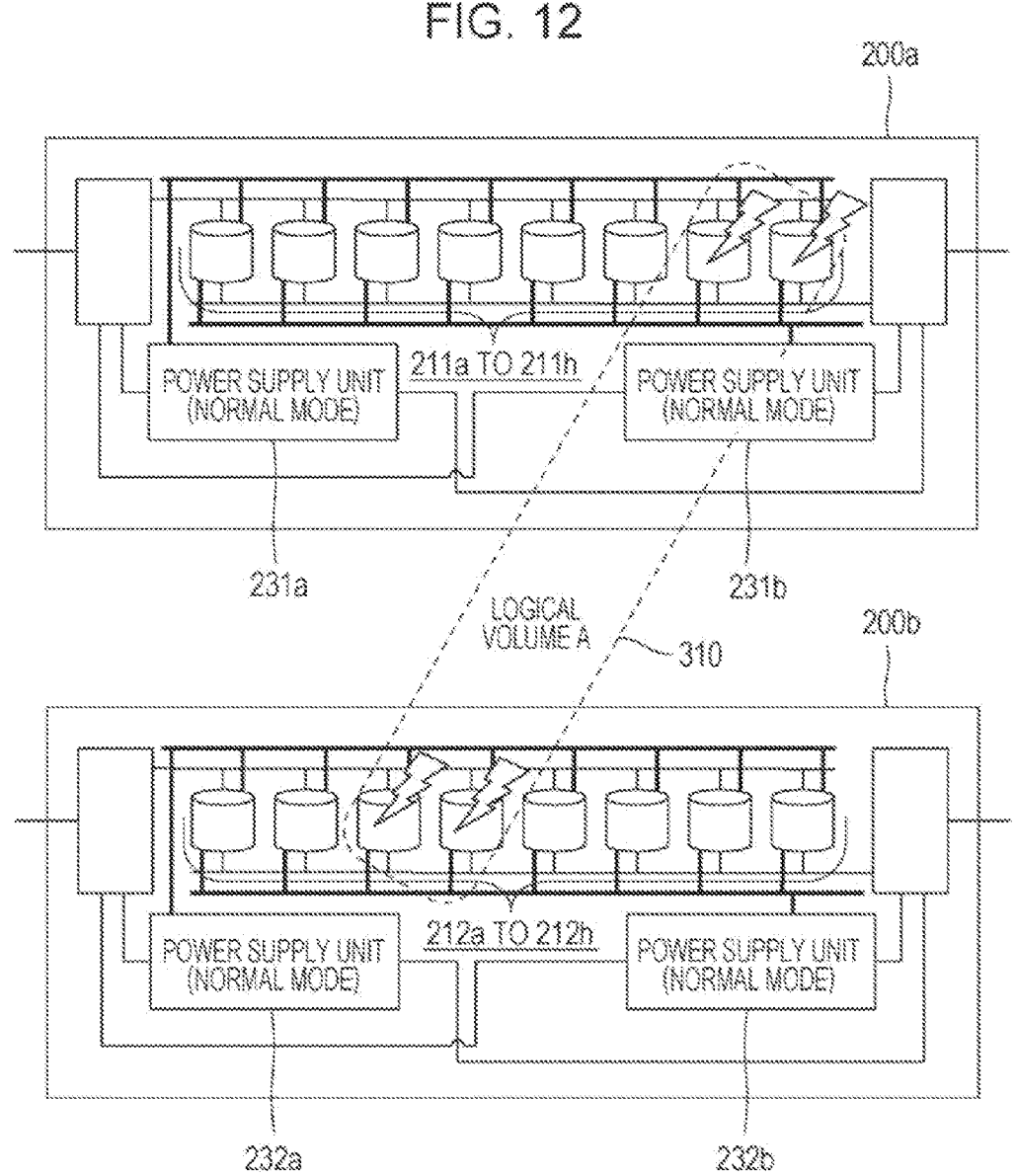
FIG. 12 illustrates an example of operations by a storage system according to the second embodiment.

As illustrated in FIG. 12, in Case 1, an access request is issued for information belonging to a logical volume A 310 set in the stopping RAID group including two storages within the device enclosure 200a and two storages within the device enclosure 200b.

In this case, since the access request is for one logical volume, the power-supply control portion 140 simultaneously starts storages included in the RAID group corresponding to the access-requested logical volume. Thus, the number of storages to be started in each of the device enclosures 200a and 200b is 2 and is lower than the maximum number "3" of storages which are operable in the normal mode. Therefore, the power-supply control portion 140 sets the power supply units 231a and 231b and 232a and 232b in the device enclosures 200a and 200b, respectively, to the normal mode and starts the RAID group.

[Case 2]

Figure 13:
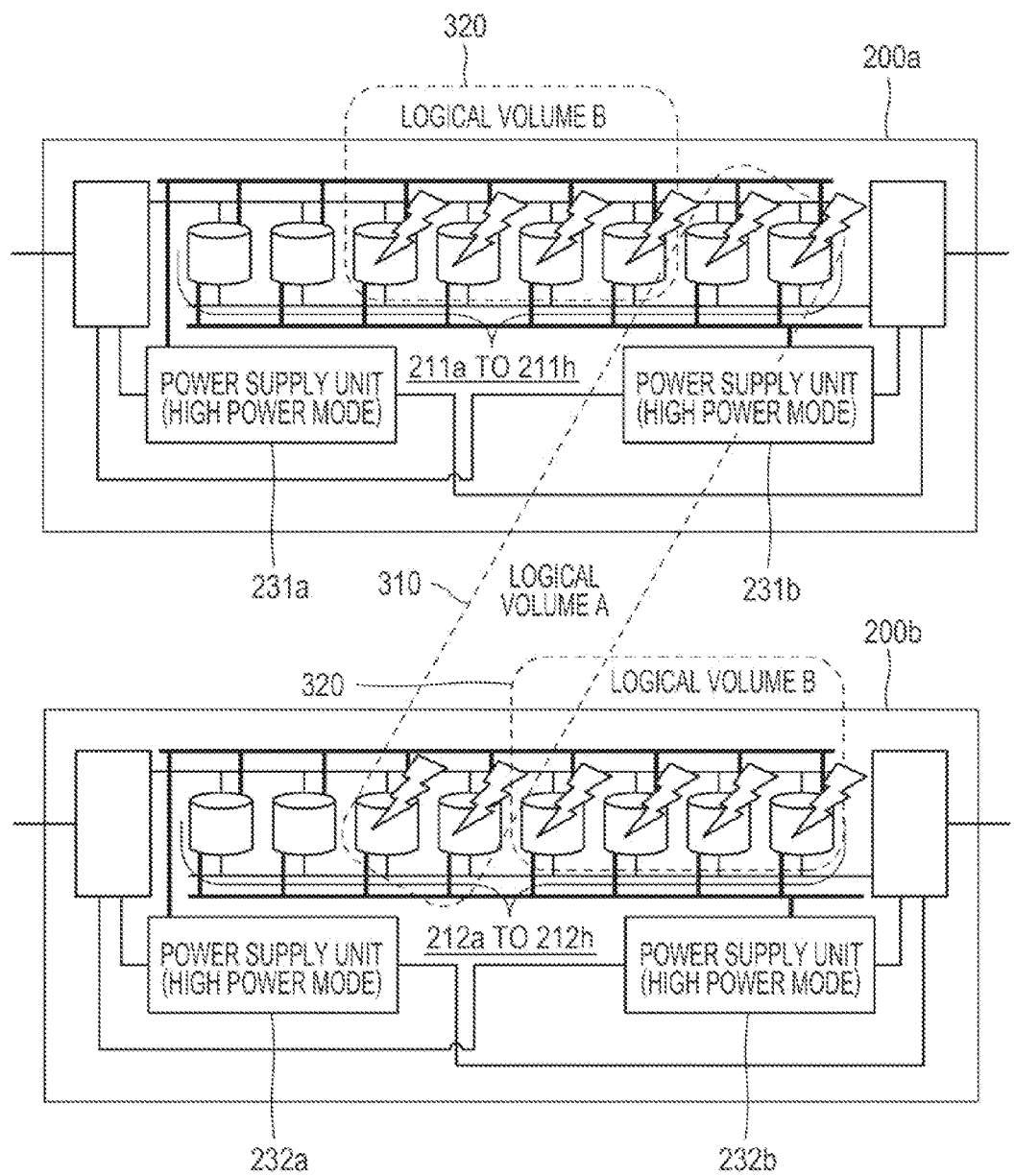
FIG. 13 illustrates an example of operations by the storage system according to the second embodiment.

As illustrated in FIG. 13, in Case 2, access requests are issued for information belonging to the following two logical volumes. One of them is the logical volume A 310 set to the stopping RAID group including two storages in the device enclosure 200a and two storages in the device enclosure 200b. The other is a logical volume B 320 set to a stopping RAID group including four storages in the device enclosure 200a and four storages in the device enclosure 200b.

In this case, since the number "6" of storages to be started in each of the device enclosures 200a and 200b, respectively, is equal to the maximum number "6" of storages which are operable when the power supply units are in the high power mode, the power-supply control portion 140 simultaneously starts the corresponding RAID groups. Thus, the number of storages to be started in each of the device enclosures 200a and 200b is 6 and is higher than the maximum number "3" of storages which are operable when the power supply units are in the normal mode. Therefore, the power-supply control portion 140 sets the power supply units 231a and 231b and 232a and 232b in the device enclosures 200a and 200b, respectively, to the high power mode and starts the RAID groups.

[Case 3]

Figure 14:
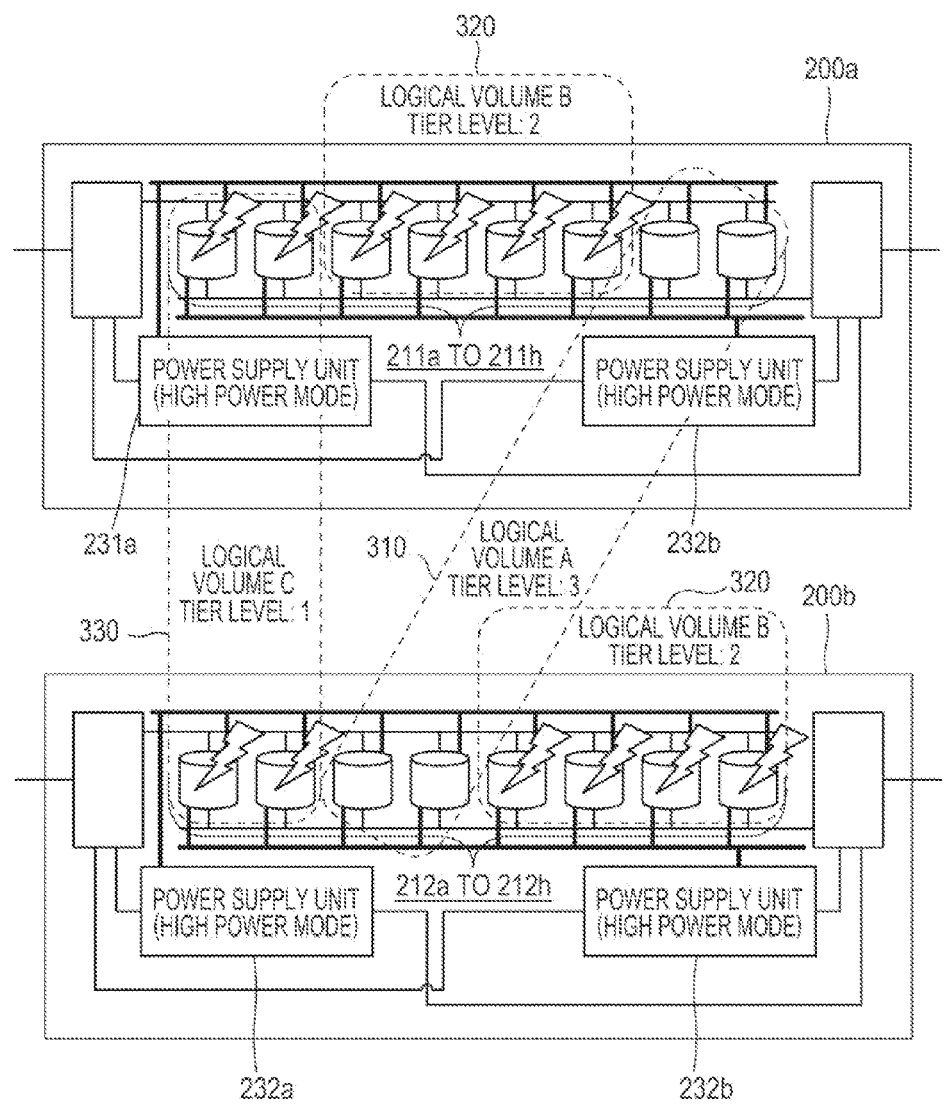
FIG. 14 illustrates an example of operations by the storage system according to the second embodiment.

As illustrated in FIG. 14, in Case 3, access requests are issued for information belonging to the following three logical volumes. One of them is the logical volume A 310 set to the stopping RAID group including two storages in the device enclosure 200a and two storages in the device enclosure 200b. Another one is a logical volume B 320 set to a stopping RAID group including four storages in the device enclosure 200a and four storages in the device enclosure 200b. Another one is a logical volume C 330 set to the stopping RAID group including two storages in the device enclosure 200a and two storages in the device enclosure 200b. As described above, Tier Levels are priority level information on logical volumes, and it is assumed here that the logical volume A has Tier Level 3, the logical volume B has Tier Level 2, and the logical volume C has Tier Level 1.

In this case, the number "8" of storages to be started in each of the device enclosures 200a and 200b is higher than the maximum number "6" of storages which are operable when the power supply unit is in the high power mode. Thus, the power-supply control portion 140 does not simultaneously start the corresponding RAID groups but selects a logical volume with a high priority level from the plurality of logical volumes A 310 to C 330. It is assumed here the logical volumes B 320 and C 330 excluding the logical volume A 310 with the lowest priority level are selected.

When the RAID groups corresponding to the logical volumes B 320 and C 330 are to be started, the number "6" of storages to be started in each of the device enclosures 200a and 200b is equal to the maximum number "6" of storages when the power supply units are in the high power mode. Thus, the power-supply control portion 140 simultaneously starts the RAID groups corresponding to the logical volumes B 320 and C 330. Since the number of storages to be started in the device enclosures 200a and 200b is higher than the maximum number "3" of storages which are operable when the power supply units are in the normal mode, the power-supply control portion 140 sets the power supply units 231a and 231b and 232a and 232b in the device enclosures 200a and 200b to the high power mode and starts the RAID groups.

Figure 15:
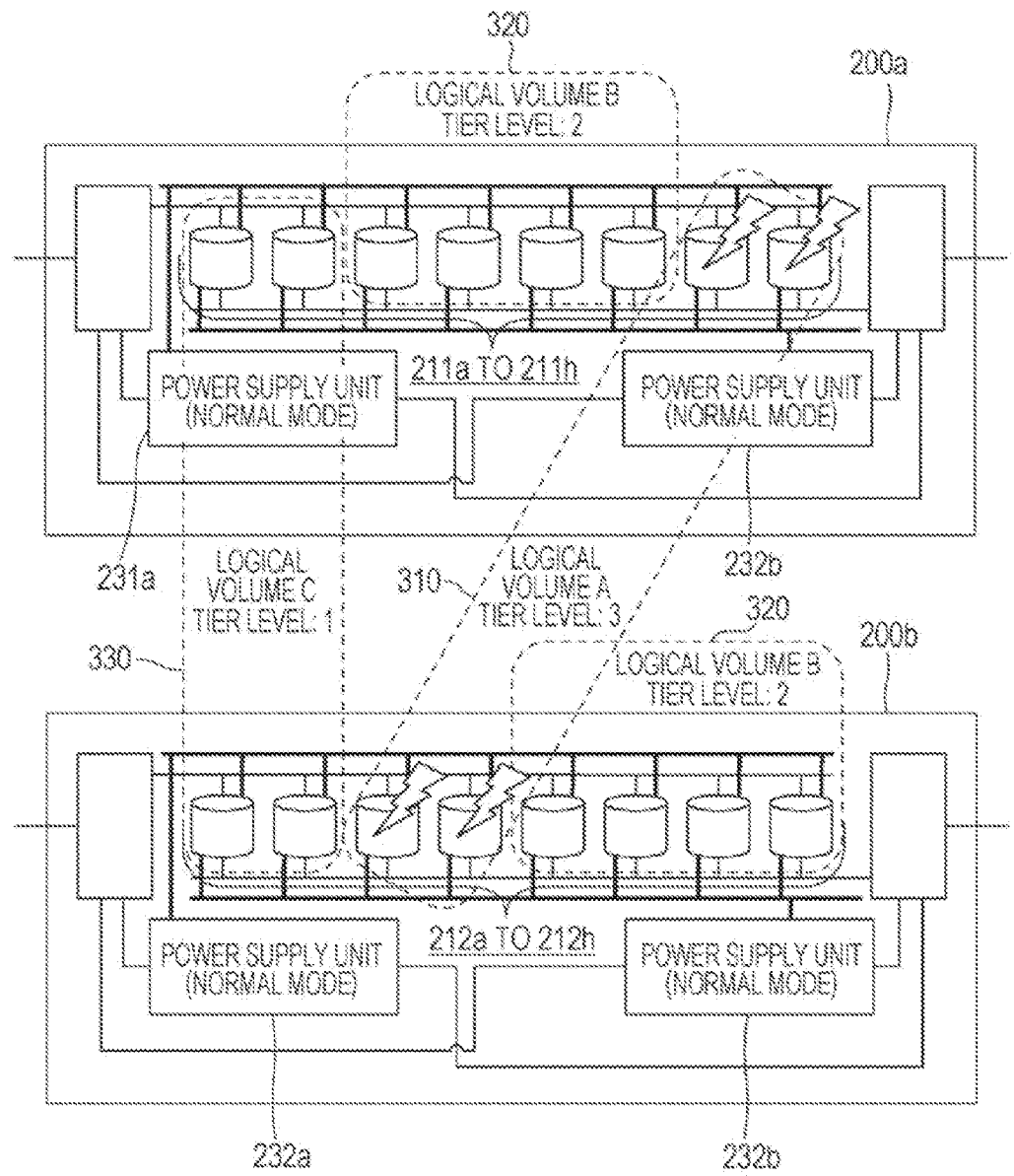
FIG. 15 illustrates an example of operations by the storage system according to the second embodiment.

Next, as illustrated in FIG. 15, the power-supply control portion 140 starts the RAID groups corresponding to the remaining logical volume A 310. Since the number "2" of storages to be started in each of the device enclosures 200a and 200b is lower than the maximum number "3" of storages which are operable in the normal mode, the power-supply control portion 140 sets the power supply units 231a and 231b and 232a and 232b in the device enclosures 200a and 200b to the normal mode and starts the RAID groups.

[Case 4]

Figure 16:
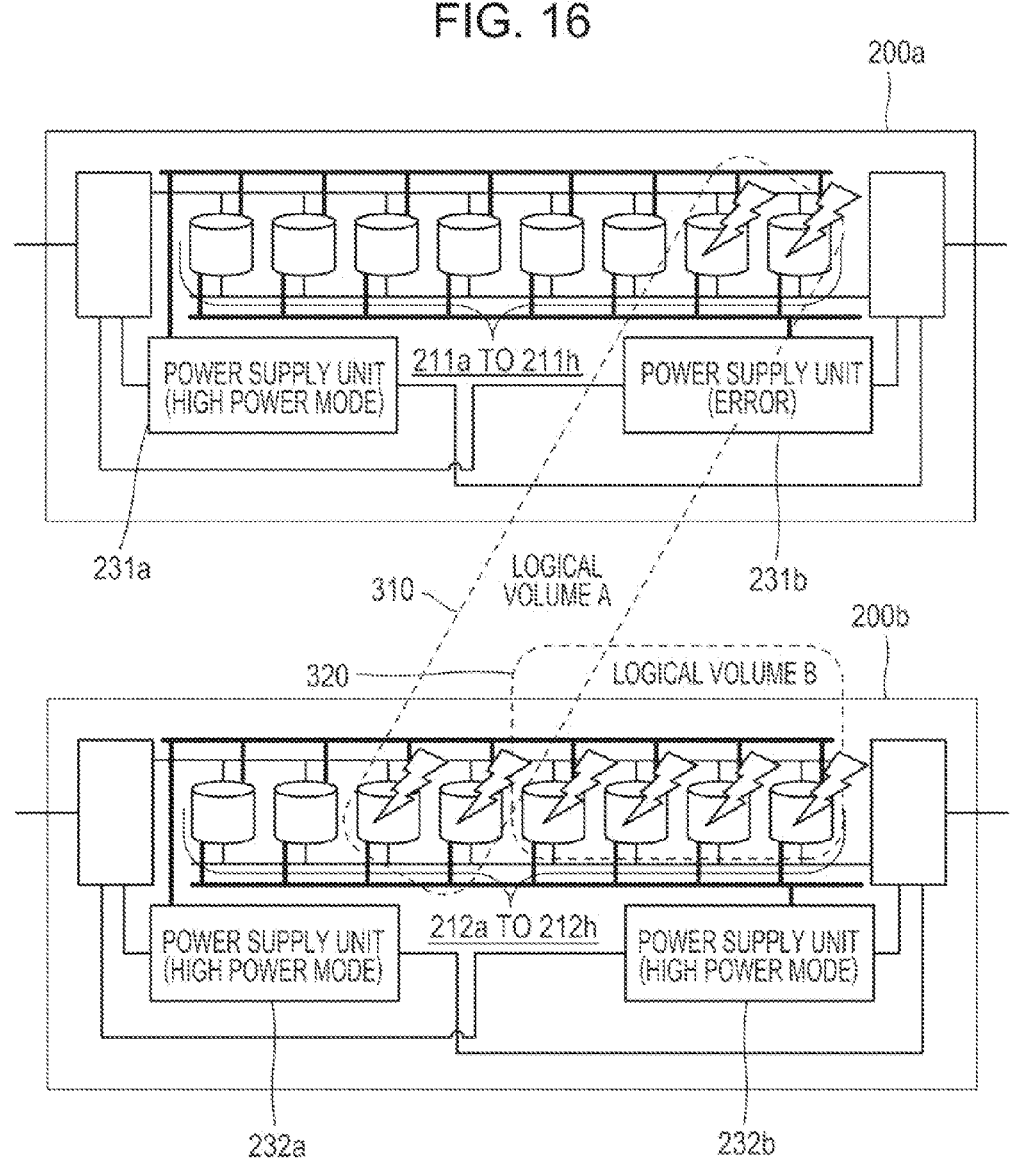
FIG. 16 illustrates an example of operations by the storage system according to the second embodiment.

As illustrated in FIG. 16, in Case 4, access requests are issued for information belonging to the following two logical volumes. One of them is the logical volume A 310 set to the stopping RAID group including two storages in the device enclosure 200a and two storages in the device enclosure 200b. The other is the logical volume B 320 set to a stopping RAID group including four storages in the device enclosure 200b. Further in Case 4, it is assumed that the power supply unit 231b in the device enclosure 200a has an error, and the maximum number of storages which are operable in the normal mode in the device enclosure 200a is "1", and the maximum number of storages which may be started in the high power mode is "3".

In this case, the number "2" of storages to be started in the device enclosure 200a is lower than the maximum number "3" of storages which are operable in the high power mode. The number "6" of storages to be started in the device enclosure 200b is equal to the maximum number "6" of storages which are operable in the high power mode. Thus, the power-supply control portion 140 simultaneously starts the corresponding RAID groups. In this case, the number of storages to be started in the device enclosure 200a is "2" and is higher than the maximum number "1" of storages which are operable in the device enclosure 200a in the normal mode. Thus, the power-supply control portion 140 sets the power supply unit 231a in the device enclosure 200a to the high power mode and starts the RAID groups. The number of storages to be started in the device enclosure 200b is "6" and is higher than the maximum number "3" of storages which are operable in the device enclosure 200b. Therefore, the power-supply control portion 140 sets the power supply units 232a and 232b in the device enclosure 200b to the high power mode and starts the RAID groups.

[Case 5]

Figure 17:
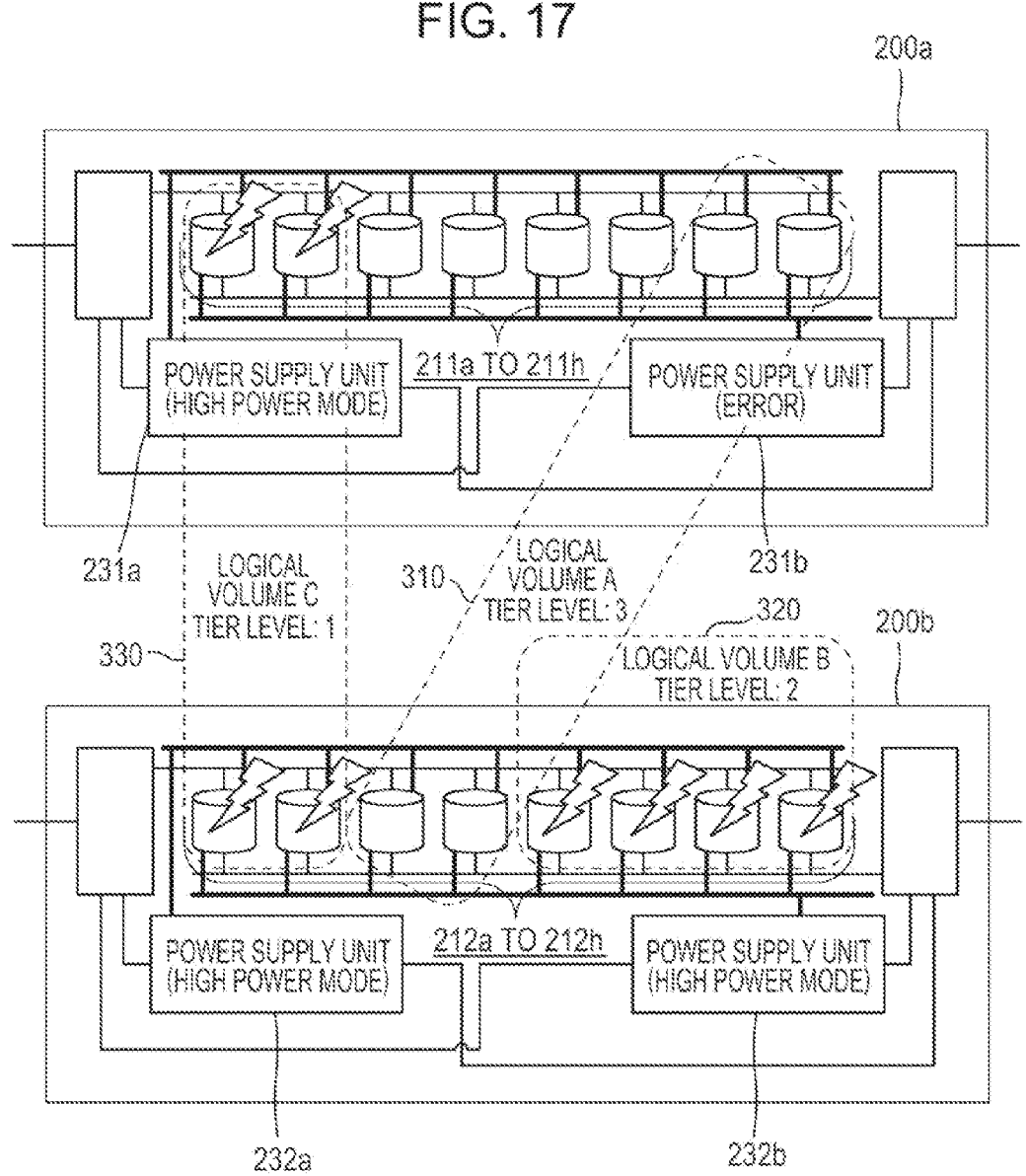
FIG. 17 illustrates an example of operations by the storage system according to the second embodiment.

As illustrated in FIG. 17, in Case 5, access requests are issued for information belonging to the following three logical volumes. One of them is the logical volume A 310 set to the stopping RAID group including two storages in the device enclosure 200a and two storages in the device enclosure 200b. Another one is the logical volume B 320 set to a stopping RAID group including four storages in the device enclosure 200b. Another one is the logical volume C 330 set to the stopping RAID group including two storages in the device enclosure 200a and two storages in the device enclosure 200b. As described above, Tier Levels are priority level information on logical volumes, and it is assumed here that the logical volume A has Tier Level 3, the logical volume B has Tier Level 2, and the logical volume C has Tier Level 1.

In Case 5, it is assumed that the power supply unit 231b in the device enclosure 200a has an error, and the maximum number of storages which are operable in the normal mode in the device enclosure 200a is "1" and the maximum number of storages which are operable in the high power mode is "3".

In this case, the number "8" of storages to be started in the device enclosure 200b is higher than the maximum number "6" of storages which are operable in the device enclosure 200b in the high power mode. Thus, the power-supply control portion 140 does not simultaneously start the corresponding RAID groups but selects a logical volume with a high priority level from the plurality of logical volumes A 310 to C 330. It is assumed here the logical volumes B 320 and C 330 excluding the logical volume A 310 with the lowest priority level are selected.

When the RAID groups corresponding to the logical volumes B 320 and C 330 are to be started, the number "2" of storages to be started in the device enclosure 200a is lower than the maximum number "3" of storages which are operable in the high power mode, and the number "6" of storages to be started in the device enclosure 200b is equal to the maximum number "6" of storages which are operable in the high power mode, the power-supply control portion 140 simultaneously starts the RAID groups corresponding to the logical volumes B 320 and C 330. Thus, the number of storages to be started in the device enclosure 200a is "2" and is higher than the maximum number "1" of storages which are operable in the normal mode. Therefore, the power-supply control portion 140 sets the power supply unit 231a in the device enclosure 200a to the high power mode and starts the RAID group. The number of storages to be started in the device enclosure 200b is "6" and is higher than the maximum number "3" of storages which are operable in the normal mode. Therefore, the power-supply controls portion 140 sets the power supply units 232a and 232b in the device enclosure 200b to the high power mode and starts the RAID group.

Figure 18:
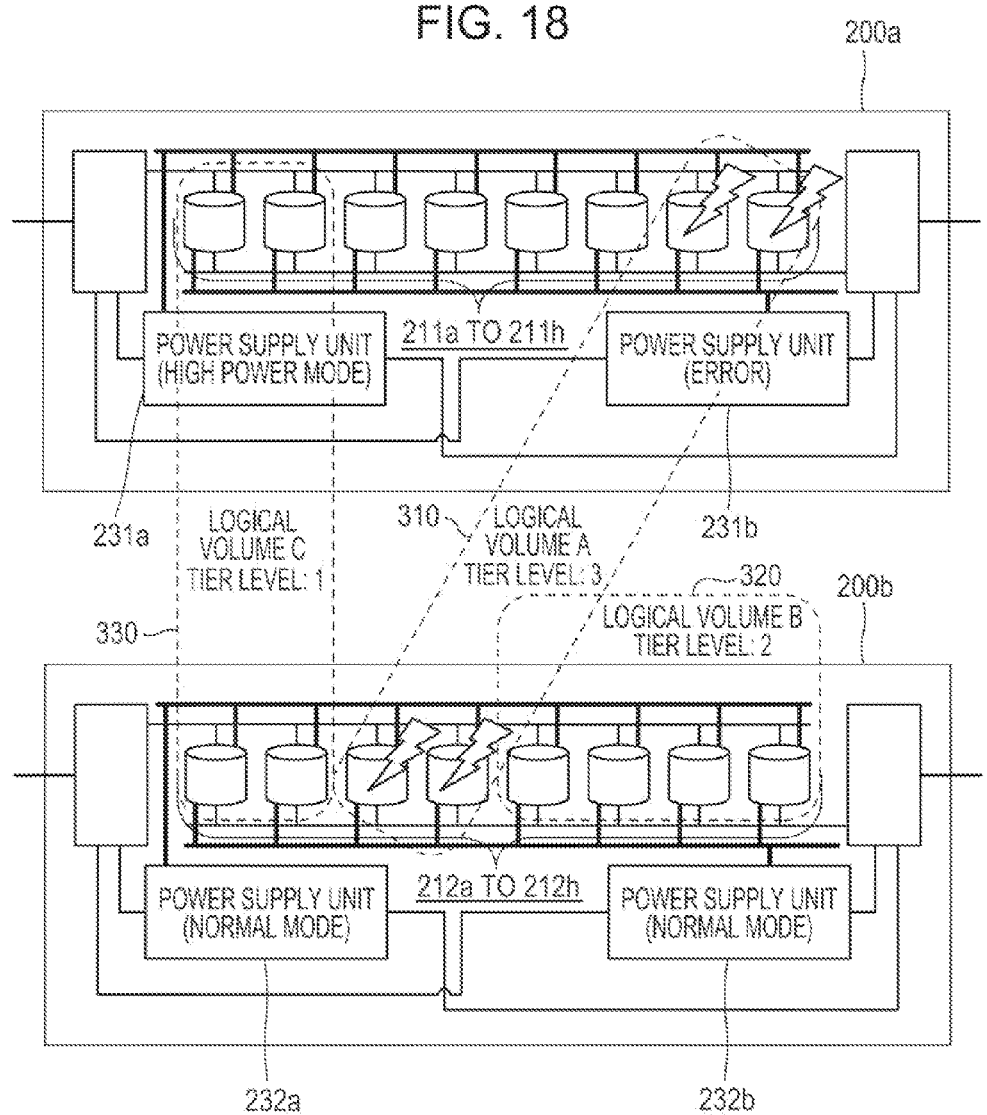
FIG. 18 illustrates an example of operations by the storage system according to the second embodiment.

Next, as illustrated in FIG. 18, the power-supply control portion 140 starts the RAID group corresponding to the remaining logical volume A 310. Thus, the number of storages to be started in the device enclosure 200a is "2" and is higher than the maximum number "1" of storages which are operable in the normal mode. Therefore, the power-supply control portion 140 sets the power supply unit 231a in the device enclosure 200a to the high power mode and starts the RAID group. The number of storages to be started in the device enclosure 200b is "2" and is lower than the maximum number "3" of storages which are operable in the normal mode. Therefore, the power-supply control portion 140 sets the power supply units 232a and 232b in the device enclosures 200b to the normal mode and starts the RAID group.

[Case 6]

In Case 6, as illustrated in FIG. 19, start processing of starting RAID groups is being performed based on access requests for information belonging to the logical volumes A 310, B 320, and C 330 (which is an initial starting state). As illustrated in FIG. 20, an access request for information belonging to the logical volume D 340 is issued. In Case 6, the upper limit numbers of the power supply units which are operable in the high power mode among the power supply units in all device enclosures is "4".

As illustrated in FIG. 19, the logical volume A 310 is set to a RAID group including two storages in the device enclosure 200b and two storages in the device enclosure 200c. The logical volume B 320 is set to a RAID group including four storages in the device enclosure 200c. The logical volume C 330 is set to a RAID group including two storages in the device enclosure 200b and two storages in the device enclosure 200c. Tier Levels are priority level information on logical volumes, and it is assumed here that the logical volume A 310 has Tier Level 3, the logical volume B 320 has Tier Level 2, and the logical volume C 330 has Tier Level 1.

In the beginning state, the logical volumes B 320 and C 330 are selected based on the priority level information and the corresponding RAID groups are being started. The RAID group corresponding to the logical volume A 310 is not started. The power supply units 232a and 232b in the device enclosure 200b are in the normal mode. And the power supply units 233a and 233b in the device enclosure 200c are in the high power mode.

From this beginning state, as illustrated in FIG. 20, access request is performed for information belonging to a logical volume D 340 set to the stopping RAID group including four storages in the device enclosure 200a. In this case, the logical volume D 340 has Tier Level 1.

When the RAID group corresponding to the logical volume D 340 is to be started, the number "4" of storages to be started in the device enclosure 200a is higher than the maximum number "3" of storages which are operable in the normal mode. Thus, the power-supply control portion 140 sets the power supply units 231a and 231b in the device enclosure 200a to the high power mode. As a result, the number of power supply units set in the high power mode in the device enclosures 200a to 200c is "4" which is equal to the upper limit number "4" in the high power mode. Thus, the power-supply control portion 140 sets the power supply units 231a and 231b in the device enclosure 200a to the high power mode and starts the RAID group corresponding to the logical volume D 340.

In this way, the controller module 100a serially starts the RAID groups based on the priority level of the logical volumes to which the access-requested information belongs. When a plurality of access requests are issued, the access requests desiring high readiness may be given high priority levels. Thus, access requests desiring high readiness may be processed in the priority order. Therefore, the readiness desired for access may be improved.

In the controller module 100a, the priority levels of the logical volumes are calculated based on their access histories. Thus, the frequency of access requests is reflected on the priority levels. Therefore, since storages with high access frequencies are given priority to start, the readiness for entire accesses may be improved.

The processing according to the aforementioned embodiments may be implemented by causing a computer to execute a specific program. In such cases, a program describing processing details to be implemented is provided. A program describing the processing details may be recorded in a computer-readable recording medium. The computer-readable recording medium may be a magnetic recording device, an optical disk, a magneto-optical recording medium, or a semiconductor memory, for example. The magnetic recording device may be a hard disk device, a flexible disk (FD), a magnetic tape (MT) or the like. The optical disk may be a DVD (digital versatile disc), a DVD-RAM, a CD-ROM (compact disc read only memory), a CD-R (recordable), a CD-RW (rewritable) or the like. The magneto-optical recording medium may be an MO (magneto-optical disk) or the like.

In order to distribute the program, a portable recording medium such as a DVD and a CD-ROM recording the program may be sold, for example. Alternatively, the program may be stored in a storage device for a server computer, and the program may be transferred from the server computer to another computer through a network.

The computer which executes the program may store the program recorded in a portable recording medium or the program transferred from the server computer in its storage device, for example. The computer may read the program from the storage device for the computer and perform processing based on the program. The computer may directly read the program from a portable recording medium and perform processing based on the program. The computer may sequentially perform processing based on the received program every time the program is transferred from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage management apparatus comprising:
a memory for storing logical volume information for indicating a plurality of logical volumes and priority information for determining an order of the plurality of logical volumes to be activated;
a first interface for connecting a plurality of storages to the storage management apparatus, at least one of the plurality of storages corresponding to one of the logical volumes;
a second interface connected to a power supply unit for supplying power to the plurality of storages; and
a processor for executing:
determining whether the power supply unit is capable of supplying power for simultaneously starting the storages corresponding to the logical volumes corresponding to an access request for accessing the logical volumes,
selecting one of the logical volumes on the basis of the priority information when the power supply unit is incapable of supplying power for simultaneously starting the storages corresponding to the logical volumes corresponding to the access request, and
transmitting a start request for staring the storages corresponding to the selected logical volume by using the first interface.

2. The storage management apparatus according to claim 1, wherein the priority information is set on the basis of readiness of the each of the plurality of the logical volumes.

3. The storage management apparatus according to claim 1, wherein the priority information is set on the basis of types of the storages included in corresponding logical volume.

4. The storage management apparatus according to claim 1, wherein the priority information is set on the basis of access frequencies for accessing the logical volume.

5. The storage management apparatus according to claim 1, wherein the power supply unit operates in a normal mode in which a normal amount of power is supplied and in a high power mode in which more power than that in the normal mode is supplied.

6. The storage management apparatus according to claim 1, wherein the processor determines whether the power supply unit is capable of supplying power for simultaneously starting the storages corresponding to the detected logical volumes on the basis of maximum amount of power which may be supplied by the power supply unit, current amount of power consumption, and starting power for one storage.

7. A storage system comprising:
a plurality of storages; and
a storage management apparatus including:
 a memory for storing logical volume information for indicating a plurality of logical volumes and priority information for determining an order of the plurality of the logical volumes to be activated;
 a first interface for connecting a plurality of storages to the storage management apparatus, at least one of the plurality of storages corresponding to one of the logical volumes;
 a second interface connected to a power supply unit for supplying power to the plurality of storages; and
 a processor for executing:
  determining whether the power supply unit is capable of supplying power for simultaneously starting the storages corresponding to the logical volumes corresponding to an access request for accessing the logical volumes,
  selecting one of the logical volumes on the basis of the priority information when the power supply unit is incapable of supplying power for simultaneously starting the storages corresponding to the logical volumes corresponding to the access request, and
  transmitting a start request for staring the storages corresponding to the selected logical volume by using the first interface.

8. The storage system according to claim 7, wherein the priority information is set on the basis of readiness of the each of the plurality of the logical volumes.

9. The storage system according to claim 7, wherein the priority information is set on the basis of types of the storages included logical volume.

10. The storage system according to claim 7, wherein the priority information is set on the basis of access frequencies for accessing to the logical volume.

11. The storage system according to claim 7, wherein the power supply unit operates in a normal mode in which a normal amount of power is supplied and a high power mode in which more power than that in the normal mode is supplied.

12. The storage system according to claim 7, wherein the processor determines whether the power supply unit is capable of supplying power for simultaneously starting the storages corresponding to the detected logical volumes on the basis of maximum amount of power which may be supplied by the power supply unit, current amount of power consumption, and starting power for one storage.

13. A method for controlling a storage management apparatus, comprising:
 determining, by the storage management apparatus, whether a power supply unit for supplying power to the plurality of storages is capable of supplying power for simultaneously starting storages corresponding to logical volumes corresponding to an access request for accessing the logical volumes, the storages being connected to the storage management apparatus, at least one of the storages corresponding to one of the logical volumes;
 selecting one of the logical volumes on the basis of priority information for determining an order of the plurality of the logical volumes to be activated when the power supply unit is incapable of supplying power for simultaneously starting the storages corresponding to the logical volumes corresponding to the access request; and
 transmitting a start request for staring the storages corresponding to the selected logical volume.

14. The method according to claim 13, wherein the priority information is set on the basis of readiness of the each of the plurality of the logical volumes.

15. The method according to claim 13, wherein the priority information is set on the basis of types of the storages included in corresponding logical volume.

16. The method according to claim 13, wherein the priority information is set on the basis of access frequencies for accessing to the logical volume.

17. The method according to claim 13, wherein the power supply unit operates in a normal mode in which a normal amount of power is supplied and a high power mode in which more power than that in the normal mode is supplied, and further comprising determining that the power supply unit is operated in the high power mode when the power supply unit is incapable of supplying power for simultaneously starting the storages corresponding to the detected logical volumes.

18. The method according to claim 13, further comprising determining whether the power supply unit is capable of supplying power for simultaneously starting the storages corresponding to the detected logical volumes on the basis of maximum amount of power which may be supplied by the power supply unit, current amount of power consumption, and starting power for one storage.

* * * * *